United States Patent
Uruma et al.

(10) Patent No.: US 10,708,439 B2
(45) Date of Patent: Jul. 7, 2020

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Kazuhiro Uruma, Moriya (JP); Kaori Nakagawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 107 days.

(21) Appl. No.: 15/880,306

(22) Filed: Jan. 25, 2018

(65) Prior Publication Data

US 2018/0220006 A1    Aug. 2, 2018

(30) Foreign Application Priority Data

Feb. 1, 2017 (JP) .................................. 2017-016794

(51) Int. Cl.
*H04M 3/51* (2006.01)
*H04L 29/06* (2006.01)
*H04M 7/00* (2006.01)

(52) U.S. Cl.
CPC ........ *H04M 7/006* (2013.01); *H04L 65/1006* (2013.01); *H04L 65/1069* (2013.01); *H04L 65/608* (2013.01); *H04M 3/5191* (2013.01); *H04M 7/003* (2013.01); *H04M 2201/52* (2013.01)

(58) Field of Classification Search
None
See application file for complete search history.

(56) References Cited

U.S. PATENT DOCUMENTS

| 5,637,845 | A | * | 6/1997 | Kolls | ..................... G06Q 20/00 235/380 |
| 2005/0044232 | A1 | * | 2/2005 | Keane | ..................... G06Q 30/06 709/227 |
| 2006/0229054 | A1 | * | 10/2006 | Erola | ..................... H04M 1/24 455/403 |
| 2007/0079363 | A1 | * | 4/2007 | Itoh | ......................... H04N 1/44 726/5 |

(Continued)

FOREIGN PATENT DOCUMENTS

| JP | 11-41406 A | 2/1999 |
| JP | 2015-32224 A | 2/2015 |

*Primary Examiner* — Duc T Duong
(74) *Attorney, Agent, or Firm* — Canon U.S.A., Inc. IP Division

(57) ABSTRACT

An information processing apparatus includes a detection unit that detects a start of using a voice communication unit in a set period during processing for establishing a connection with another information processing apparatus for performing remote assistance for the information processing apparatus, a display control unit that, when a start of using the voice communication unit is detected, displays a notification screen including a telephone number set as contact information of an assistance source of the remote assistance and an instruction object for instructing to make a phone call to a communication destination corresponding to the telephone number, and a calling unit that, when a phone call to the communication destination is specified via the instruction object in the notification screen, makes a phone call to the communication destination.

14 Claims, 11 Drawing Sheets

(56) References Cited

U.S. PATENT DOCUMENTS

| | | | |
|---|---|---|---|
| 2008/0091800 A1* | 4/2008 | Sorrentino | H04N 1/00244 709/219 |
| 2009/0265629 A1* | 10/2009 | Dantwala | H04N 1/00244 715/705 |
| 2011/0270771 A1* | 11/2011 | Coursimault | G06Q 10/06 705/304 |
| 2013/0212163 A1* | 8/2013 | Shimomoto | H04N 1/00225 709/203 |
| 2014/0169540 A1* | 6/2014 | Suga | H04M 7/0024 379/93.09 |
| 2014/0270128 A1* | 9/2014 | Suito | H04M 3/51 379/201.02 |
| 2015/0301765 A1* | 10/2015 | Nishiyama | G06F 3/1203 358/1.15 |
| 2015/0365268 A1* | 12/2015 | Sunata | H04L 49/35 709/203 |
| 2017/0006114 A1* | 1/2017 | Mande | H04L 67/148 |
| 2017/0093932 A1* | 3/2017 | Fukushima | G06F 9/452 |

* cited by examiner

FIG.3
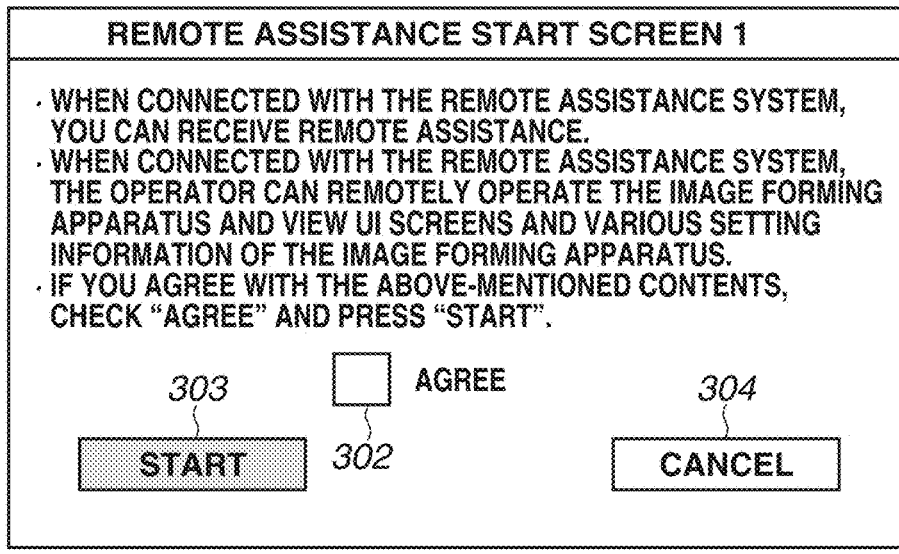
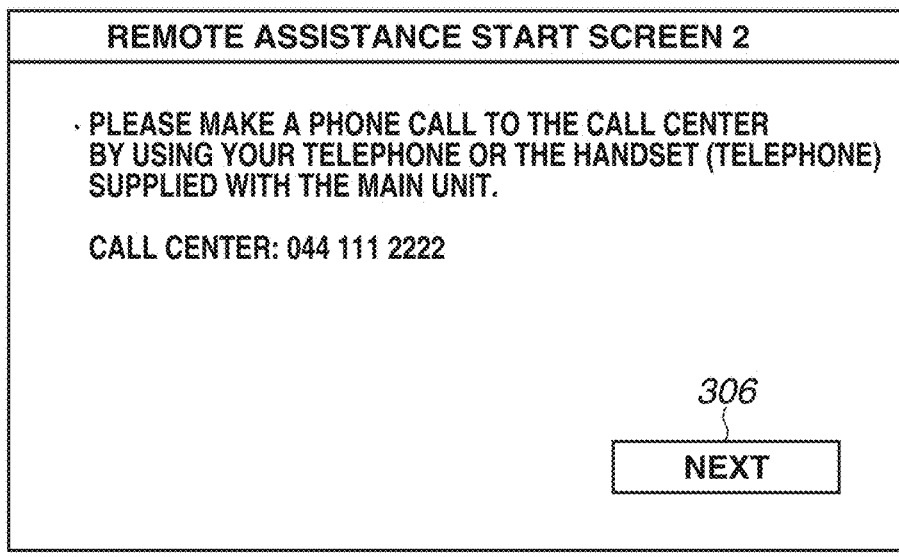
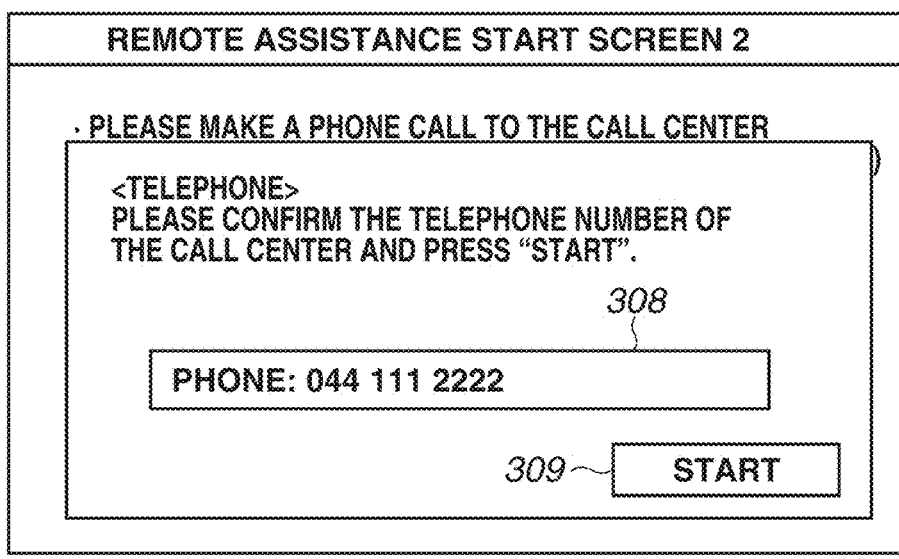

FIG.6

```
INVITE sip:2222@canon.com SIP/2.0
. . . .
To:2222<sip:2222@canon.com>
From:"1111(1234)"<sip:1111@canon.com>;tag=12345678
. . . .
```

601

INFORMATION PROCESSING APPARATUS, INFORMATION PROCESSING METHOD, AND STORAGE MEDIUM

BACKGROUND

Field

The present disclosure relates to an information processing apparatus, an information processing method, and a storage medium.

Description of the Related Art

Japanese Patent Application Laid-Open No. 11-41406 discusses a technique for enabling an operator to rapidly understand a trouble status by capturing and transmitting a personal computer (PC) screen of a customer.

Such a remote assistance system can include an image forming apparatus as a remote assistance reception side and an information processing apparatus, such as a PC, as a remote assistance provision side. In this configuration, the operator remotely operates user interfaces (UIs) of the image forming apparatus to instruct the image forming apparatus to suitably make settings and perform operations.

Japanese Patent Application Laid-Open No. 2015-32224 discusses a technique in which two different information terminals blocked from each other by a firewall connect with a relay server connectable as a Hypertext Transfer Protocol (HTTP) client to establish a session between the information terminals. In such a system, the relay server requires an identifier for associating communication between an information processing apparatus of a customer and an information processing apparatus of a call center. The relay server issues a serial number serving as the identifier to the information processing apparatus of the customer or the information processing apparatus of the call center connected first. If the information processing apparatus of the call center is connected first, a call center operator notifies the customer of the serial number through a voice communication. Remote assistance is started when the customer manually inputs the serial number from an operation unit of the information processing apparatus of the customer.

In such a remote assistance service, a voice communication is used between the customer and the call center operator as a means for performing information transmission when a trouble occurs and a means for communicating during remote maintenance.

SUMMARY

An information processing apparatus according to the present disclosure includes a detection unit configured to detect a start of using a voice communication unit in a set period during processing for establishing a connection with another information processing apparatus for performing remote assistance for the information processing apparatus, a display control unit configured to, when a start of using the voice communication unit is detected by the detection unit, display on a display unit a notification screen including a telephone number set as contact information of an assistance source of the remote assistance and an instruction object for instructing to make a phone call to a communication destination corresponding to the telephone number, and a calling unit configured to, when a phone call to the communication destination is specified via the instruction object included in the displayed notification screen, perform calling processing for making a phone call to the communication destination.

Further features will become apparent from the following description of exemplary embodiments with reference to the attached drawings.

BRIEF DESCRIPTION OF THE DRAWINGS

FIG. 3 is a diagram illustrating examples of assistance start screens.

FIG. 6 is a diagram illustrating an example of an "INVITE" message.

DESCRIPTION OF THE EMBODIMENTS

Exemplary embodiments will be described in detail below with reference to the accompanying drawings.

When starting remote assistance, for example, a customer and a call center operator perform the following operations. The customer performs an operation for finding the telephone number of the call center, an operation for making a phone call to the call center, and an operation for notifying the operator of the status of trouble. The customer (or operator) performs, for example, an operation for notifying the operator (or customer) of a serial number acquired from a server for mediating a connection between an information processing apparatus of the customer and an information processing apparatus of the call center.

As described above, there has been a problem that, when starting remote assistance, the customer and the call center operator need to perform various operations taking a lot of time and effort.

However, a technique discussed in Japanese Patent Application Laid-Open No. 11-41406 notifies a call center operator of UI screen information on an information processing apparatus of a customer during remote assistance. A technique discussed in Japanese Patent Application Laid-Open No. 2015-32224 establishes a session between two information terminals blocked by a firewall. Accordingly, it has conventionally been difficult to reduce time and effort for starting remote assistance.

Figure 1:
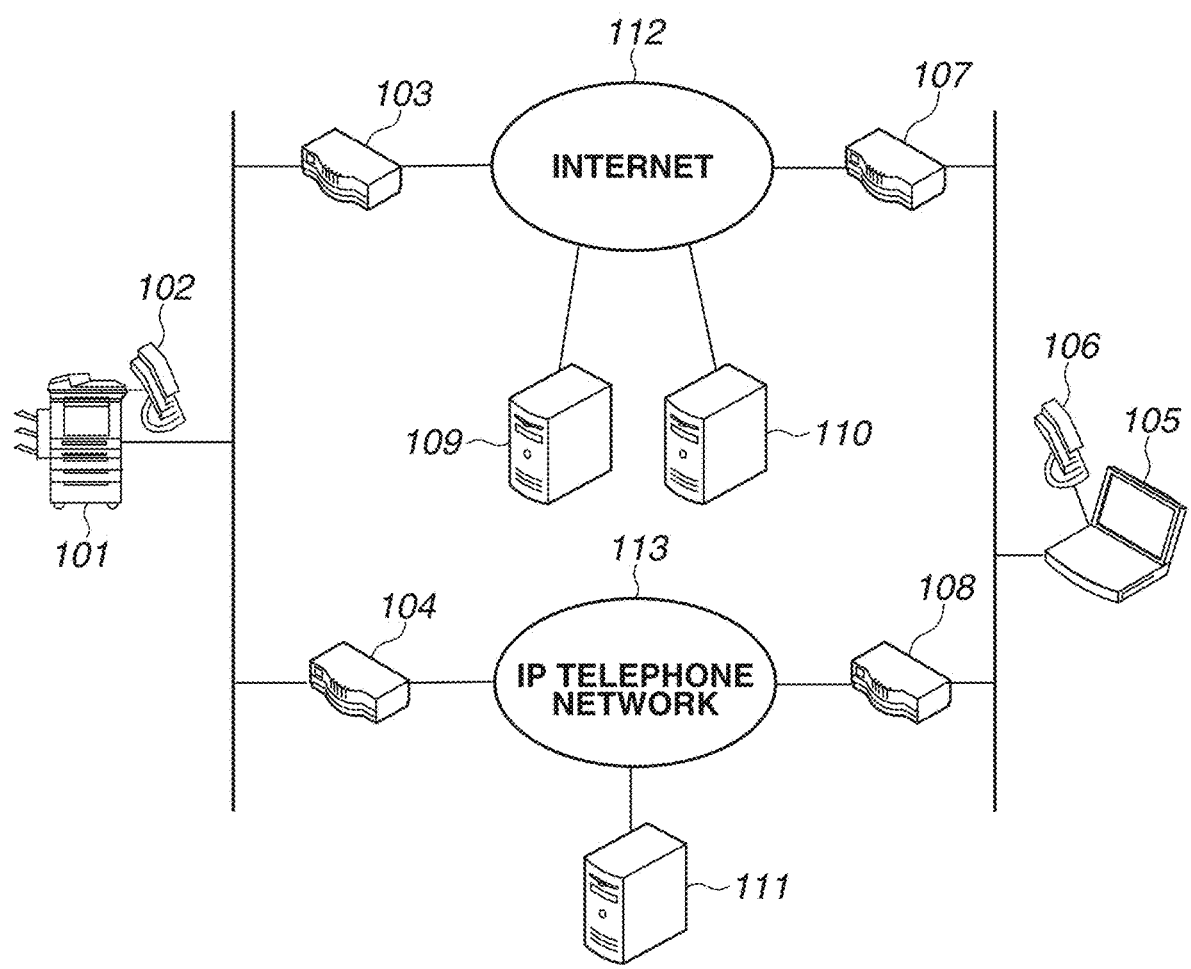
FIG. 1 is a diagram illustrating an example of a system configuration of an assistance system.

FIG. 1 is a diagram illustrating an example of a system configuration of an assistance system according to a first exemplary embodiment.

The assistance system includes an image forming apparatus 101, an operator PC 105, a relay server 109, a management server 110, and a Session Initiation Protocol (SIP) server 111.

The image forming apparatus 101 provided in the user environment is a multifunction peripheral or printer having a print function and a scan function operated by a user. The image forming apparatus 101 is an example of a first information processing apparatus. The operator PC 105 is a personal computer (PC), server apparatus, or tablet apparatus provided in a call center and operated by a call center operator. The operator PC 105 is an example of a second information processing apparatus. The call center is a facility where user inquiries about the image forming apparatus 101 are received. If trouble such as an error occurs in the image forming apparatus 101, the user of the image forming apparatus 101 makes an inquiry to the call center.

Referring to an example illustrated in FIG. 1, the image forming apparatus 101 is connected to the Internet 112 via a firewall (hereinafter referred to as a FW) 103. Likewise, the operator PC 105 is connected to the Internet 112 via a FW 107.

Whereas the FW 103 permits the image forming apparatus 101 provided in the user environment to connect to the Internet 112, the FW 103 performs control to refuse a connection from the Internet 112 to the image forming apparatus 101.

Likewise, although the FW 107 permits the operator PC 105 provided in the call center to connect to the Internet 112, the FW 107 performs control to refuse a connection from the Internet 112 to the operator PC 105.

The image forming apparatus 101 and the operator PC 105 have a HTTP data communication function. The HTTP, a client/server type protocol defined by Request For Comment (RFC) 2616, includes a plurality of methods. A method refers to a method for issuing a request to a communication destination.

When a client receives information from a server, the client uses the GET method. When the client transmits information to the server, the client uses the POST method. The GET method is a method for acquiring resources of a specified Uniform Resource Identifier (URI). The POST method is a method for transmitting a local resource to a specified URI.

The relay server 109 is a server including a PC or server apparatus for providing a service for relaying between the image forming apparatus 101 and the operator PC 105 via the Internet 112.

According to the present exemplary embodiment, the image forming apparatus 101 and the operator PC 105 implement communication by using GET, POST, and other HTTP methods.

When the operator PC 105 transmits data such as a moving image, audio data, and remote control information to the image forming apparatus 101, the operator PC 105 first transmits a POST request and target data of the POST request to the relay server 109. The relay server 109 buffers the received data subject to the POST request in the random access memory (RAM) of the relay server 109. Subsequently, when the image forming apparatus 101 transmits a GET request to the relay server 109, the relay server 109 returns, as a response, the data buffered in the RAM of the relay server 109 to the image forming apparatus 101.

On the other hand, when the image forming apparatus 101 transmits data to the operator PC 105, the image forming apparatus 101 transmits a POST request and target data of the POST request to the relay server 109. Then, the relay server 109 buffers the received data in the RAM of the relay server 109. Subsequently, when the operator PC 105 transmits a GET request to the relay server 109, the relay server 109 transmits, as a response, the data buffered in the RAM of the relay server 109 to the operator PC 105.

Even in an environment where the FW 103 and 107 are provided, the above-described processing enables the user of the image forming apparatus 101 to receive assistance through a voice communication, moving image communication, and remote control from the call center operator via the operator PC 105. An assistance provided by such a remote apparatus is referred to as remote assistance. An example of remote assistance will be described below. For instance, the operator executes a function of acquiring a report of an application program in the operator PC 105. This function allows the operator to acquire status information of the image forming apparatus 101, such as apparatus configuration information, abrasion status, and operating status, from the image forming apparatus 101. The operator can also execute a function of accessing a web server in the image forming apparatus 101 via a web browser in the operator PC 105. This function allows the operator to change settings of the image forming apparatus 101, check images and print data stored in the hard disk drive (HDD) of the image forming apparatus 101, and manage applications. As a remote assistance function, the operator PC 105 can remotely display the contents of an assistance manual on the operation unit of the image forming apparatus 101 from the operator PC 105 by using a content sharing function via the web browser. As another remote assistance function, the operator PC 105 can activate a UI application server based on Java (registered trademark) in the image forming apparatus 101 and control a Java client application in the operator PC 105 to display native operation screens of the image forming apparatus 101 as an image on the operator PC 105. The native operation screens of the image forming apparatus 101 refer to operation screens for inputting instructions to the firmware of the image forming apparatus 101, such as copy operation screens and print job control screens. An X server or remote desktop may be implemented by using functions of an operating system (OS) instead of the UI application server.

According to the present exemplary embodiment, the operator PC 105 performs remote assistance for the image forming apparatus 101. More specifically, according to the present exemplary embodiment, the assistance source of remote assistance is the operator PC 105, and the assistance destination of remote assistance is the image forming apparatus 101. According to the present exemplary embodiment, assistance data refers to various types of data transferred between the operator PC 105 and the image forming apparatus 101 to provide remote assistance to the user of the image forming apparatus 101.

When transmitting a POST request or GET request to the relay server 109, the image forming apparatus 101 and the operator PC 105 specify a common (Uniform Resource Locator) URL as an assistance URL. The assistance URL is relay information required by the image forming apparatus 101 and the operator PC 105 to communicate with each other via the relay server 109. The image forming apparatus 101 and the operator PC 105 start remote assistance on the premise that common assistance URL information is stored in the HDD 205 of the image forming apparatus 101 and the HDD 224 of the operator PC 105.

The management server 110 is an information processing apparatus, such as a PC and server apparatus, which checks whether the management server 110 or the operator PC 105 that requested the management server 110 for authentication is registered as a device included in the assistance system.

The management server 110 transmits as an authentication token a result of the confirmation to the confirmation request source.

Based on the authentication token, the relay server 109 can determine whether the management server 110 and the operator PC 105 are correctly authenticated by the management server 110. Referring to an information control table, the management server 110 may check whether the image forming apparatus 101 that requested the management server 110 for authentication has a specific contract, and transmit a result of the confirmation as an authentication token.

According to the present exemplary embodiment, the image forming apparatus 101 is connected with an Internet Protocol (IP) telephone apparatus 102 and controls the IP telephone apparatus 102. The IP telephone apparatus 102 is a handset type telephone apparatus for using the IP telephone. However, the IP telephone apparatus 102 may be a headset type telephone apparatus for using the IP telephone. The IP telephone apparatus 102 is an example of a voice communication unit of the image forming apparatus 101. Also, the image forming apparatus 101 may include the IP telephone apparatus 102. The image forming apparatus 101 can make a phone call to an arbitrary communication partner via the IP telephone apparatus 102 by dialing the telephone number of the communication partner.

Likewise, the operator PC 105 is connected with the IP telephone apparatus 106 to control the IP telephone apparatus 106. The IP telephone apparatus 106 is a handset type telephone apparatus for using the IP telephone. However, the IP telephone apparatus 106 may be a headset type telephone apparatus for using the IP telephone. Also, the operator PC 105 may include the IP telephone apparatus 106. The operator PC 105 can make a phone call to an arbitrary communication partner via the IP telephone apparatus 106 by dialing the telephone number of the communication partner.

The image forming apparatus 101 and the operator PC 105 have a voice communication function for performing a voice communication by executing SIP call control and Real-time Transport Protocol (RTP) by using the IP telephone apparatuses 102 and 106, respectively.

According to the present exemplary embodiment, the IP telephone apparatus 102 is connected to an Internet Protocol (IP) telephone network 113 via an office gateway (OGW) 104. The IP telephone apparatus 106 is connected to the IP telephone network 113 via an OGW 108. The IP telephone network 113 is a public IP network using the Internet Protocol (IP) technology for achieving communications integrating phone calls, data communication, and streaming broadcast. The IP telephone network 113 is an example of a voice communication network serving as a network for voice communications.

When the user of the image forming apparatus 101 receives remote assistance, the user can use the IP telephone apparatus 102 to connect with the IP telephone apparatus 106 provided in the call center environment by dialing the telephone number of the call center and perform a voice communication with the call center operator.

The SIP server 111 is an information processing apparatus such as a PC and server apparatus for managing and controlling IP telephone services based on SIP. The SIP server 111 manages user identification information including the telephone number notified from an IP telephone terminal such as the IP telephone apparatuses 102 and 106, manages data indicating a location on the networks, such as the IP address, and mediates between the calling side and the incoming side. Then, when the IP telephone terminal connects to the network, the IP telephone terminal notifies the SIP server 111 of the telephone number and IP address of the IP telephone terminal. Then, the IP telephone terminal is registered to the SIP server.

When the user performs a call operation via the IP telephone apparatus 102, an outgoing notification is sent to the incoming side via the SIP server 111. Then, when the incoming side performs an operation for starting a phone call, for example, by lifting the receiver of the telephone, the IP telephone terminals on the calling and the incoming sides directly connect with each other to become ready for a voice communication.

Figure 2:
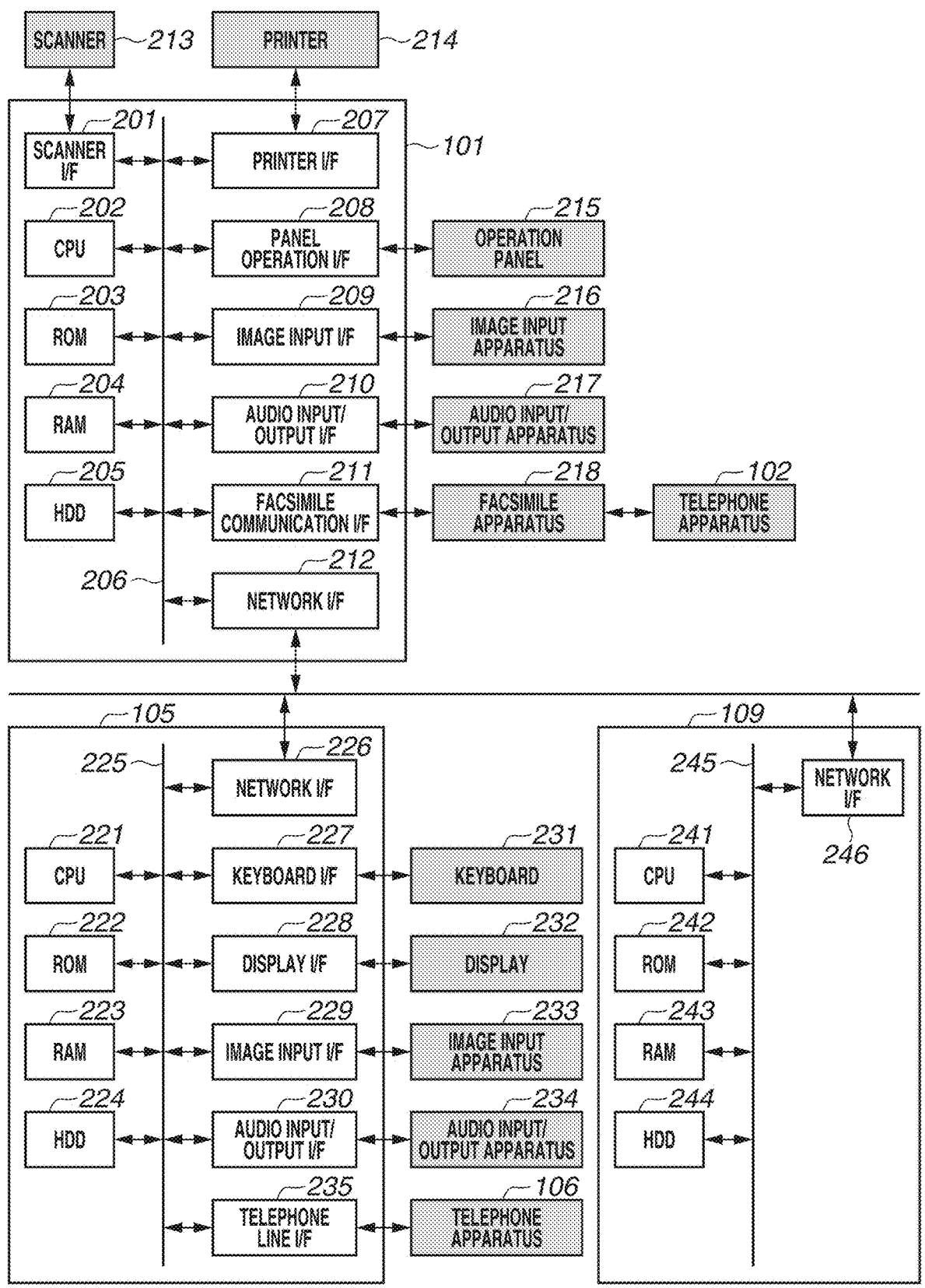
FIG. 2 is a block diagram illustrating an example of a hardware configuration of each component of the assistance system.

FIG. 2 is a block diagram illustrating an example of a hardware configuration of each component of the assistance system according to the present exemplary embodiment.

The image forming apparatus 101 includes a scanner interface (I/F) 201, a central processing unit (CPU) 202, a read only memory (ROM) 203, a RAM 204, and an HDD 205. The image forming apparatus 101 includes a printer I/F 207, a panel operation I/F 208, an image input I/F 209, an audio input/output I/F 210, a facsimile communication I/F 211, and a network I/F 212. These units are communicably connected with each other via a system bus 206.

The scanner I/F 201 is an interface used to control images input from the scanner 213.

The CPU 202 is a central processing unit for comprehensively controlling accesses to various types of devices connected to the system bus 206 based on a control program stored in the ROM 203 or the HDD 205.

The ROM 203 is a storage device storing a control program executable by the CPU 202.

The RAM 204 is a storage device which mainly functions as a main memory of the CPU 202 and as a work area, and is configured to be extended in memory capacity by using an optional RAM to be connected to an extension port.

The HDD 205 is a storage device for storing a boot program, various applications, font data, user files, and editing files. Although, according to the present exemplary embodiment, the image forming apparatus 101 uses the HDD 205 as a storage for storing various types of information, other external storages such as a Secure Digital (SD) card and flash memory can also be used as a storage.

The printer I/F 207 is an interface used to control images output to the printer 214.

The panel operation I/F 208 is an interface used to control the display of the operation panel 215 and control the input of various setting information set on the operation panel 215.

The image input I/F 209 is an interface used to control image information input from an image input apparatus 216 such as a camera.

The audio input/output I/F 210 is an interface used to control audio information input to and output from the audio input/output apparatus 217 such as a headset.

The facsimile communication I/F 211 is an interface used to input information to and output information from the facsimile machines 218. The facsimile machine 218 is connected to the IP telephone network 113 via the OGW 104. The facsimile machine 218 is also connected with the IP telephone apparatus 102. The IP telephone apparatus 102 can make a phone call to an arbitrary communication partner by dialing the telephone number thereof. The image forming apparatus 101 can transmit by facsimile an image read by the scanner 213 to an arbitrary communication partner via the facsimile machine 218. The image forming apparatus 101 can print via the printer 214 an image received by facsimile via the facsimile machine 218.

The network I/F 212 is an interface used for data communication via the Internet 112 using a network cable.

The following functions and processing are implemented when the CPU 202 performs processing based on a program stored in the ROM 203 or HDD 205. More specifically, the CPU 202 implements functions of the image forming apparatus 101, processing of the image forming apparatus 101 in the sequence diagrams described below with reference to FIGS. 4, 5, and 9, and processing in flowcharts described below with reference to FIGS. 7 and 10.

The operator PC 105 includes a CPU 221, a ROM 222, a RAM 223, an HDD 224, a network I/F 226, a keyboard I/F 227, a display I/F 228, an image input I/F 229, an audio input/output I/F 230, and a telephone line I/F 235. The above-described units are communicably connected with each other via a system bus 225.

The CPU 221 is a central processing unit for comprehensively controlling access to various devices connected to the system bus 225 based on a control program stored in the ROM 222 or HDD 224.

The ROM 222 is a storage device for storing a control program executable by the CPU 221.

The RAM 223 is a storage device which mainly functions as a main memory of the CPU 221 and as a work area, and is configured to be extended in memory capacity by using an optional RAM to be connected to an extension port.

The HDD 224 is a storage device for storing a boot program, various applications, font data, user files, and editing files. Although, according to the present exemplary embodiment, the operator PC 105 uses the HDD 224 as a storage for storing various types of information, other external storages such as an SD card and flash memory can also be used as a storage.

The network I/F 226 is an interface used for communication via the Internet 112 using a network cable.

The keyboard I/F 227 is an interface used to control key entry from a keyboard 231 and a pointing device such as a mouse.

The display I/F 228 is an interface used to control the display on a display 232.

The image input I/F 229 is an interface used to control images input from an image input apparatus 233 such as a camera.

The audio input/output I/F 230 is an interface used to control audio information input to and output from the audio input/output apparatus 234 such as a headset.

The telephone line I/F 235 is an interface connectable with the IP telephone apparatus 106. The IP telephone apparatus 106 connected to the IP telephone network 113 can perform a voice communication with an arbitrary communication partner by dialing the telephone number thereof.

The following functions and processing are implemented when the CPU 221 performs processing based on a program stored in the ROM 222 or HDD 224. More specifically, the CPU 221 implements functions of the operator PC 105, processing of the operator PC 105 in the sequence diagrams described below with reference to FIGS. 4, 5, and 9, and processing in flowcharts described below with reference to FIGS. 8 and 11.

The relay server 109 includes a CPU 241, a ROM 242, a RAM 243, an HDD 244, and a network I/F 246. The above-described units are communicably connected with each other via a system bus 245.

The CPU 241 is a central processing unit for comprehensively controlling access to various devices connected to the system bus 245 based on a control program stored in the ROM 242 or HDD 244.

The ROM 242 is a storage device for storing a control program executable by the CPU 241.

The RAM 243 is a storage device which mainly functions as a main memory of the CPU 241 and as a work area, and is configured to be extended in memory capacity by using an optional RAM to be connected to an extension port.

The HDD 244 is a storage device for storing a boot program, various applications, font data, user files, and editing files. Although, according to the present exemplary embodiment, the relay server 109 uses the HDD 244 as a storage for storing various types of information, other external storages such as an SD card and flash memory can also be used as a storage.

The network I/F 246 is an interface used for data communication via the Internet 112 using a network cable.

Figure 4:
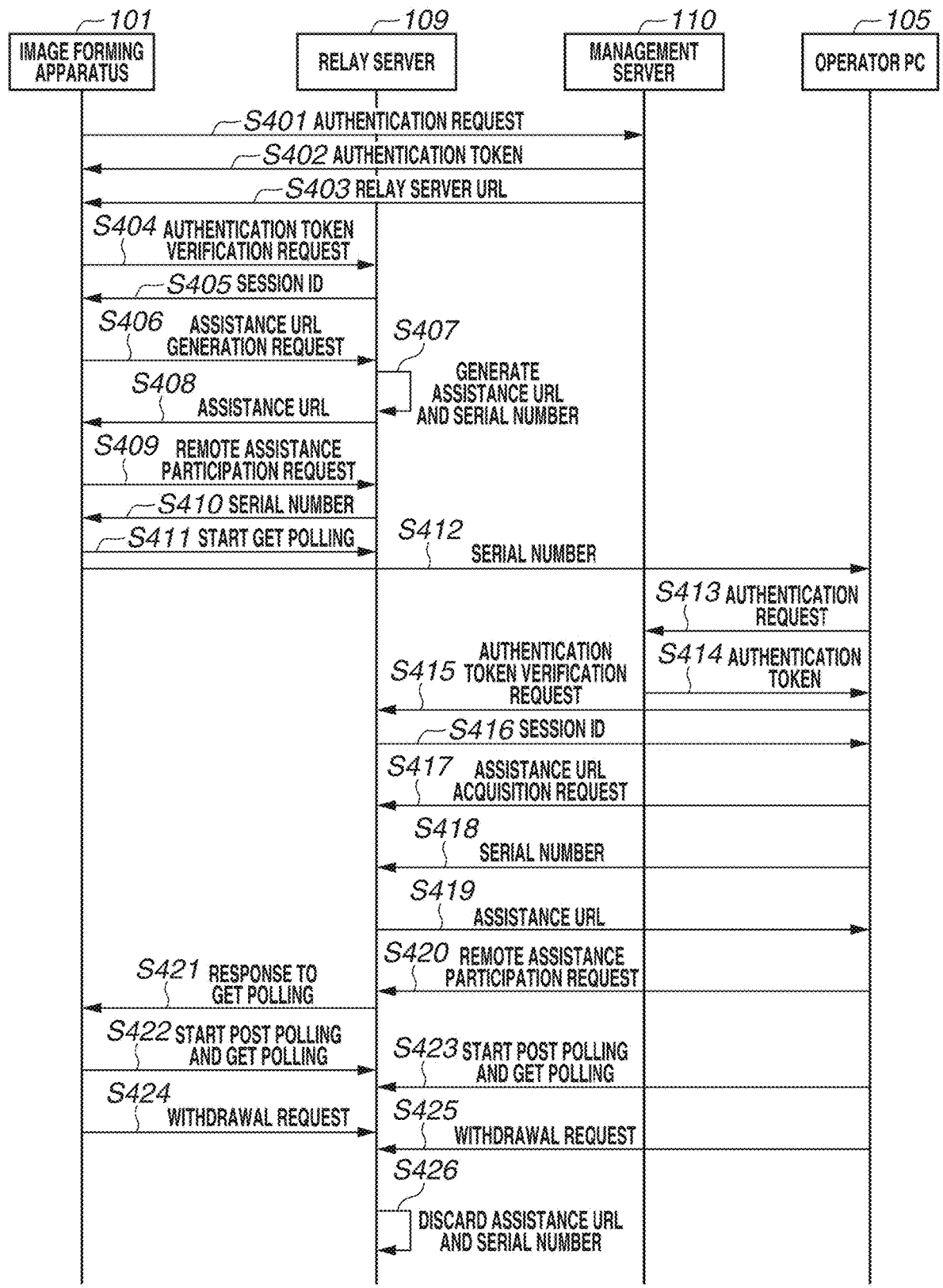
FIG. 4 is a sequence diagram illustrating an example of connection processing.
Figure 9:
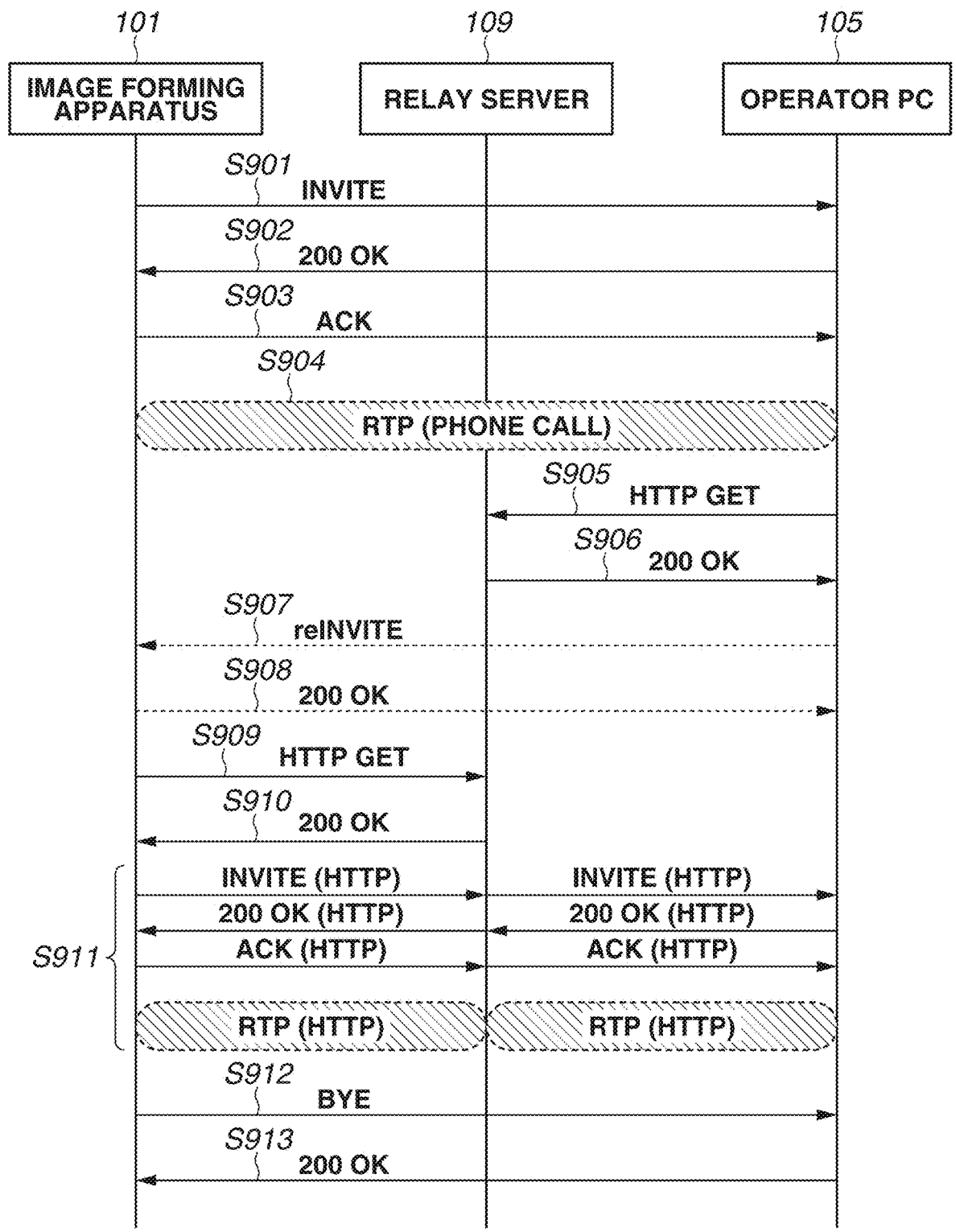
FIG. 9 is a sequence diagram illustrating an example of connection processing.

Functions of the relay server 109 and processing of the relay server 109 in the sequence diagrams described below with reference to FIGS. 4 and 9 are implemented when the CPU 241 performs processing based on a program stored in the ROM 242 or HDD 244.

The hardware configuration of the management server 110 is similar to the hardware configuration of the relay server 109.

Functions of the management server 110 and processing of the management server 110 in the sequence diagram described below with reference to FIG. 4 are implemented when the CPU of the management server 110 performs processing based on a program stored in the ROM or HDD of the management server 110.

The hardware configuration of the SIP server 111 is similar to the hardware configuration of the relay server 109. However, the network I/F of the SIP server 111 differs from the network I/F of the relay server 109 in that it is connected to the IP telephone network 113.

Figure 5:
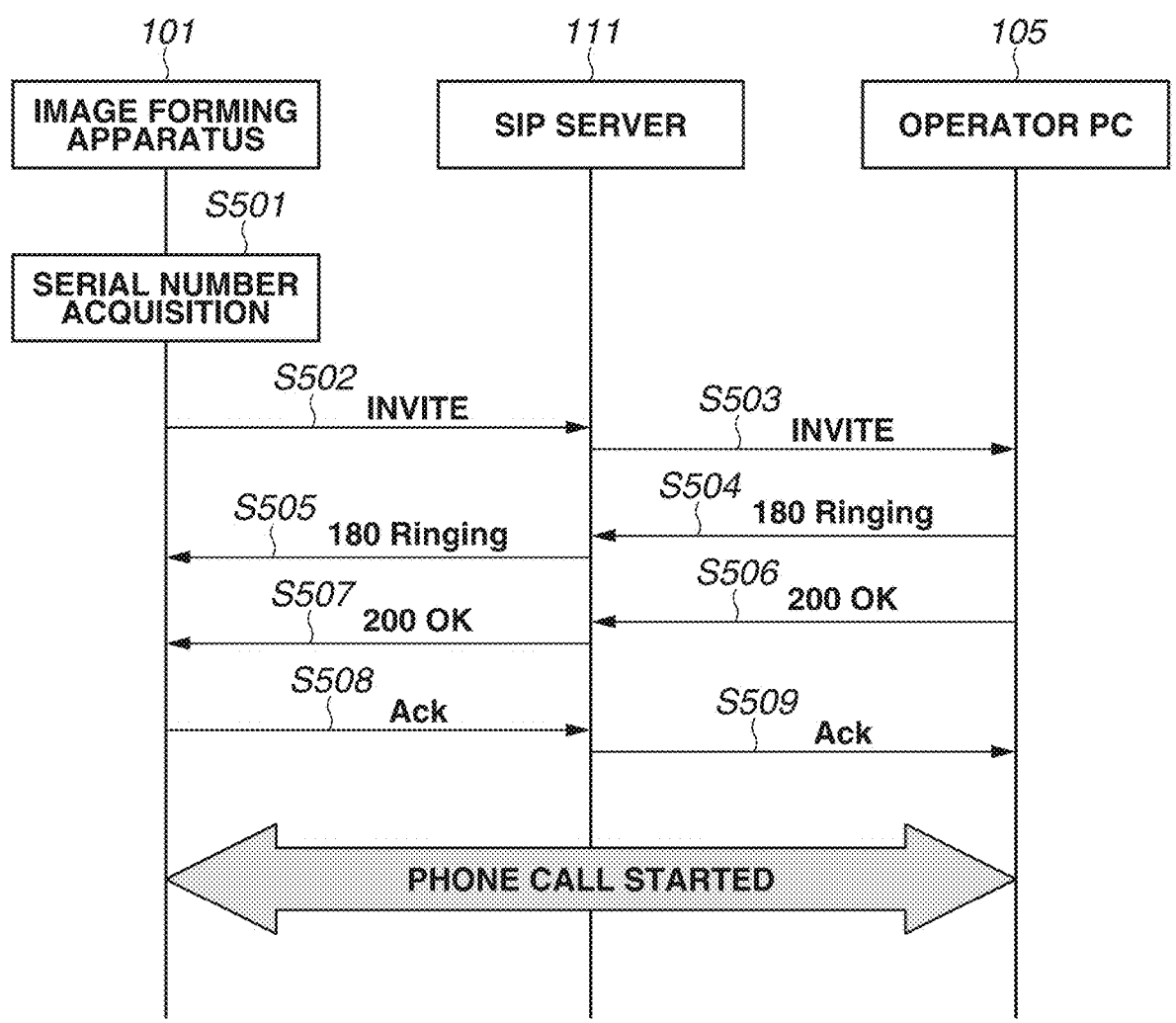
FIG. 5 is a sequence diagram illustrating an example of serial number notification processing.

Functions of the SIP server 111 and processing of the SIP server 111 in the sequence diagram described below with reference to FIG. 5 are implemented when the CPU of the SIP server 111 performs processing based on a program stored in the ROM or HDD of the SIP server 111.

FIG. 3 illustrates examples of assistance start screens. The assistance start screens are displayed when the user instructs to start remote assistance, and are used to perform operations for starting remote assistance. Upon reception of a remote assistance start request, for example, based on a user's operation via the operation panel 215, the CPU 202 displays a screen 301 (a remote assistance start screen 1 illustrated in FIG. 3) on the operation panel 215. Upon reception of a remote assistance start request, the CPU 202 starts processing for establishing a connection between the image forming apparatus 101 and the operator PC 105 for remote assistance.

In the examples illustrated in FIG. 3, the screen 301 includes a check box 302 for inputting whether to permit operations on the image forming apparatus 101 by the operator. The screen 301 includes a Start button 303 for instructing to start remote assistance and a Cancel button 304 for canceling the start of remote assistance. The screen 301 includes information about notification items and consent matters when starting remote assistance. When the screen 301 is displayed, the check box 302 is unchecked. When the check box 302 is unchecked, the Start button 303 is displayed in a gray-out state and cannot be pressed. Alternatively, the CPU 202 may not display the Start button 303 when the check box 302 is unchecked.

When the CPU 202 detects a selection of the Start button 303, the CPU 202 changes the screen display on the operation panel 215 from the screen 301 to a screen 305 (a remote assistance start screen 2 illustrated in FIG. 3). In the examples illustrated in FIG. 3, the screen 305 includes a Next button 306 to be selected after the user makes a phone call to the call center. The screen 305 includes information about the telephone number of the call center. The user makes a phone call to the call center by using the IP telephone apparatus 102 or other telephone apparatuses such as a mobile phone.

According to the present exemplary embodiment, the user makes a phone call to the call center by using the IP telephone apparatus 102. When the user makes a phone call to the call center by using other telephone apparatuses, the user selects the Next button 306. Upon detection of a selection of the Next button 306, the CPU 202 changes the screen to be displayed on the operation panel 215 to a remote assistance screen.

When the CPU 202 detects a hook-up of the IP telephone apparatus 102 while the screen 305 is displayed on the operation panel 215, the CPU 202 displays a pop-up screen 307 on the operation panel 215. More specifically, when the CPU 202 detects a hook-up of the IP telephone apparatus 102 during a period when the screen 305 appears to indicate processing for establishing a connection between the image forming apparatus 101 and the operator PC 105 for remote assistance, the CPU 202 displays the pop-up screen 307. However, the CPU 202 may display the pop-up screen 307 when the CPU 202 detects a hook-up of the IP telephone apparatus 102 even during a period when the screen 301 appears to indicate processing for establishing a connection between the image forming apparatus 101 and the operator PC 105.

The pop-up screen 307 includes a destination display field 308 for displaying the telephone number of the call center and a Start button 309 for instructing to start an operation for making a phone call to the call center. The pop-up screen 307 is an example of a notification screen for notifying the user of the telephone number of the assistance source of the above-described remote assistance. The Start button 309 is an example of an instruction object for instructing to make a phone call to the communication destination corresponding to the telephone number displayed in the destination display field 308.

The pop-up screen 307 may not include the Start button 309. In this case, for example, when the CPU 202 detects that the user has touched or clicked the destination display field 308, the CPU 202 may make a phone call to the communication destination corresponding to the telephone number displayed in the destination display field 308. In that case, the destination display field 308 is an instruction object included in the pop-up screen 307.

After confirming the telephone number of the call center, the user can make a phone call to the call center via the IP telephone apparatus 102 by selecting the Start button 309. Then, the CPU 202 changes the screen display on the operation panel 215 to the remote assistance screen. Thus, the image forming apparatus 101 can reduce user's time and effort for finding out the telephone number of the call center and inputting the telephone number.

According to the present exemplary embodiment, when the CPU 202 detects a selection of the Start button 309, the CPU 202 makes a phone call to the telephone number displayed in the destination display field 308. However, when the CPU 202 detects a hook-up of the IP telephone apparatus 102 while the screen 305 is displayed on the operation panel 215, the CPU 202 may make a phone call to a set telephone number without displaying the pop-up screen 307. The image forming apparatus 101 can reduce the load on the CPU 202 in processing for displaying the pop-up screen 307, making it possible to reduce user's time and effort for confirming the pop-up screen 307 and selecting the Start button.

FIG. 4 is a sequence diagram illustrating an example of connection processing. Processing of the image forming apparatus 101, the operator PC 105, the relay server 109, and the management server 110 in remote assistance will be described below with reference to FIG. 4.

Upon reception of a remote assistance start request based on a user's operation via the operation panel 215, the CPU 202 starts processing of the image forming apparatus 101 illustrated in FIG. 4 (processing for starting a connection with the relay server 109). The CPU 202 may receive a selection of the Next button 306 or the Start button 309 as a remote assistance start request. The CPU 202 may also receive a depression of a set hard button on the operation panel 215 as a remote assistance start request.

In step S401, the CPU 202 transmits an authentication request to the management server 110 together with the identifier of the image forming apparatus 101. The identifier of the image forming apparatus 101 is an identifier for identifying an image forming apparatus, which is unique in the world. For example, the identifier is the serial number of the image forming apparatus 101.

In step S402, based on the identifier transmitted in step S401, the CPU of the management server 110 checks whether the image forming apparatus 101 is an image forming apparatus managed by the management server 110. For example, the CPU of the management server 110 checks whether information about the transmitted identifier exists in the information control table storing information about the management target image forming apparatus stored in the management server 110. If the information exists, the management server 110 transmits an authentication token to the image forming apparatus 101. This information control table is stored in the HDD of the management server 110. The relay server 109 verifies the authentication token and can refuse a connection of an image forming apparatus not managed by the management server 110.

In step S403, based on the identifier transmitted in step S401, the CPU of the management server 110 acquires information about the URL of a relay server usable by the image forming apparatus corresponding to the identifier and transmits the acquired information about the URL to the image forming apparatus 101. The CPU of the management server 110 acquires information about the URL corresponding to the identifier transmitted in step S401, from the information control table storing information about the URL of a relay server usable by each management target image forming apparatus stored in the HDD of the management server 110.

In step S404, the CPU 202 transmits to the URL transmitted in step S403 an authentication token verification request transmitted in step S402.

In step S405, the CPU 241 verifies the authentication token in response to the authentication token verification request transmitted in step S404. For example, when the authentication token is a token managed by the management server 110, the CPU 241 determines to authenticate the image forming apparatus 101. Then, the CPU 241 transmits a session identifier (ID) as a result of the verification to the image forming apparatus 101. The session ID is data proving that a login to the relay server 109 is successful, and is data transferred to the image forming apparatus 101 in the case of an assistance URL generation request to the relay server 109. Upon reception of connection information (the URL of the relay server 109 and the authentication token) from the management server 110 to the relay server 109, the image forming apparatus 101 can acquire information of connection to the suitable relay server 109.

In step S406, the CPU 202 transmits an assistance URL generation request to the relay server 109 together with the session ID transmitted in step S405.

In step S407, the CPU 241 generates an assistance URL and a serial number including a 4-digit number. The serial number, which is information for identifying remote assistance to be performed at the present time, is used by the operator PC 105 to establish a connection with the image forming apparatus 101 via the relay server 109 for remote assistance. The serial number is an example of connection identification information for identifying a connection between the image forming apparatus 101 and the operator PC 105 in remote assistance. The serial number may be information including not only a number but also a text. The serial number generated in step S407 has a one-to-one relation with the assistance URL generated in step S407. The CPU 241 stores a pair of the assistance URL and the serial number in the RAM 243. The CPU 241 can acquire the corresponding assistance URL from the serial number by referring to the information about the pair stored in the RAM 243.

In step S408, the CPU 241 transmits the assistance URL generated in step S407 to the image forming apparatus 101.

In step S409, the CPU 202 transmits a remote assistance participation request to the assistance URL transmitted in step S408.

In step S410, the CPU 241 transmits the serial number generated in step S407 to the image forming apparatus 101. Then, the CPU 202 stores the received serial number in the RAM 204.

In step S411, the CPU 202 starts GET polling for information about remote assistance participants to the assistance URL transmitted in step S408. Polling refers to a method for determining the status of transmission and reception preparation and synchronizing processing. More specifically, the CPU 202 sequentially and periodically makes an inquiry to a plurality of apparatuses and programs and, when a certain condition is satisfied, performs processing. For example, the CPU 202 periodically transmits a participant information Get request to the relay server 109 at set intervals until a response is received from the relay server 109.

At this timing, the image forming apparatus 101 becomes ready to communicate with the relay server 109.

In step S412, the CPU 202 transmits the serial number transmitted in step S410 to the operator PC 105 of the call center. Processing for the serial number notification in step S412 will be described in detail below with reference to FIG. 5.

Subsequently, the CPU 221 performs processing for starting connection with the relay server 109.

In step S413, the CPU 221 transmits a user name and password to the management server 110 to connect with the relay server 109 to request the management server 110 for authentication.

In step S414, the CPU 221 checks whether the user of the operator PC 105 is registered in the management server 110 and verifies the password. If the user of the operator PC 105 is registered in the management server 110 and the password is correct (YES in step S414), the CPU 202 transmits an authentication token to the operator PC 105.

In step S415, the CPU 221 transmits to the relay server 109 a verification request for verifying the authentication token transmitted in step S414. Then, the CPU 241 verifies the authentication token in response to the verification request from the operator PC 105.

In step S416, the CPU 241 transmits the session ID as a result of the verification to the operator PC 105.

In step S417, the CPU 221 transmits an assistance URL acquisition request and the session ID to the relay server 109.

In step S418, the CPU 221 grasps the URL of the relay server 109 but does not grasp the assistance URL generated in step S407. Therefore, to acquire the assistance URL, the CPU 221 transmits the serial number transmitted from the image forming apparatus 101 in step S412 to the relay server 109.

In step S419, the CPU 241 identifies a serial number which agrees with the serial number notified in step S418 out of the serial numbers stored in the RAM 243, and transmits the assistance URL corresponding to the identified serial number to the operator PC 105.

In step S420, the CPU 221 transmits a remote assistance participation request to the relay server 109.

At this timing, the operator PC 105 becomes ready to communicate with the relay server 109.

In step S421, as a response to the GET polling in step S411, the CPU 241 transmits to the image forming apparatus 101 information about the operator PC 105 which transmitted the remote assistance participation request in step S420 as information about remote assistance participants.

The image forming apparatus 101 and the operator PC 105 become ready to communicate with each other via the relay server 109.

In step S422, the CPU 202 starts POST polling and GET polling for the assistance data to the assistance URL.

In step S423, the CPU 221 starts POST polling and GET polling for the assistance data to the assistance URL.

In step S424, the CPU 202 transmits a remote assistance withdrawal request to the assistance URL.

In step S425, the CPU 221 transmits a remote assistance withdrawal request to the assistance URL.

In step S426, the CPU 241 cancels the assistance URL and serial number generated in step S407 which became no longer necessary.

Upon reception of the remote assistance participation request from the image forming apparatus 101 and the operator PC 105 in steps S409 and S520, respectively, the CPU 241 buffers the information about the image forming apparatus 101 and the operator PC 105 in the RAM 243 as participant information.

Upon reception of GET polling for the information about remote assistance participants from the image forming apparatus 101 and the operator PC 105, the CPU 241 transmits the information about remote assistance participants buffered in the RAM 243 to the image forming apparatus 101 and the operator PC 105.

Upon reception of the withdrawal request from the image forming apparatus 101 and the operator PC 105 to the assistance URL, the CPU 241 deletes information about the target which transmitted the withdrawal request, from the participant information buffered in the RAM 243.

Upon reception of POST polling for the assistance data from the image forming apparatus 101 and the operator PC 105 to the assistance URL, the CPU 241 buffers the assistance data in the RAM 243. Example assistance data includes moving images, audio data, remote control instruction data, and information data included in a multifunction peripheral. The information data included in the image forming apparatus 101 includes operation information including counter values, operation logs, parts counter values indicating the abrasion level of each of a plurality of parts used in a multifunction peripheral. The information data also includes trouble information including hardware trouble and jam.

Upon reception of GET polling from the image forming apparatus 101 and the operator PC 105 to the assistance URL, the CPU 241 transmits the assistance data buffered in the RAM 243 to the image forming apparatus 101 and the operator PC 105.

FIG. 5 is a sequence diagram illustrating an example of serial number notification processing. The processing illustrated in FIG. 5 is an example of call connection processing via the IP telephone apparatuses 102 and 106. According to the present exemplary embodiment, by using the call connection processing, the assistance system transmits from the image forming apparatus 101 to the operator PC 105 the serial number transmitted to the image forming apparatus 101 in step S410.

In step S501, when the user starts an operation of the IP telephone apparatus 102 to make a phone call to the call center (for example, at the time of hook-up) to receive remote assistance, the CPU 202 acquires from the RAM 204 the serial number transmitted in step S410.

In step S502, the CPU 202 transmits an "INVITE" message as a session establishment request to the SIP server 111 via the IP telephone apparatus 102. The processing in step S502 is an example of calling processing by the image forming apparatus 101 via the IP telephone apparatus 102.

FIG. 6 illustrates an example of an "INVITE" message transmitted in step S502. In the example illustrated in FIG. 6, the first line of a message 601 includes a description "INVITEsip:2222@canon.com SIP/2.0" which indicates "INVITE". This description indicates that the request type is "INVITE", the destination is "sip:2222@canon.com", and the SIP version is 2.0.

The "To" header of the message 601 includes a description "To:2222<sip:2222@canon.com>". This description of the "To" header indicates the incoming side.

The "From" header of the message 601 includes a description "From:"1111(1234)"<sip:1111@canon.com>; tag=12345678". This description of the "From" header indicates the outgoing side, including "1111 (1234)" as "display-name" to be displayed on the incoming side, "sip: 1111@canon.com" as calling side address information, and "tag=12345678" as tag information. The description "(1234)" in the "display-name" to be displayed on the incoming side indicates the serial number acquired in step S501. According to the present exemplary embodiment, the CPU 202 adds the description of the serial number in the "From" information of the message 601 to notify the operator PC 105 of the serial number. This allows the user of the image forming apparatus 101 to transmit to the operator PC 105 the serial number received from the relay server 109, simply by performing an operation for making a phone call to the call center. In this case, the user does not need to perform any other specific operations. More specifically, the image forming apparatus 101 can reduce user's time and effort. Even if the IP address of the operator PC is unknown, the image forming apparatus 101 can transmit the serial number to the operator PC 105 via the IP telephone network 113.

In step S503, upon reception of the "INVITE" message transmitted in step S502, the CPU of the SIP server 111 transmits an "INVITE" message as a session establishment request to the IP telephone apparatus 106.

In step S504, the CPU 221 receives the "INVITE" message transmitted in step S503 via the IP telephone apparatus 106. Then, the CPU 221 transmits a "180 Ringing" message indicating the incoming state to the SIP server 111 via the IP telephone apparatus 106.

The CPU 221 acquires the serial number "1234" from the "INVITE" message received in step S504. Since the present exemplary embodiment premises that the IP telephone apparatus 106 and the operator PC 105 are communicably connected with each other, the operator PC 105 can acquire the serial number from the "INVITE" message received via the IP telephone apparatus 106. However, when the IP telephone apparatus 106 and the operator PC 105 are not communicably connected with each other, the IP telephone apparatus 106 may notify the operator of the serial number included in the received "INVITE" message by displaying the serial number on the display unit of the IP telephone apparatus 106.

In step S505, upon reception of the "180 Ringing" message transmitted in step S504, the CPU of the SIP server 111 transmits a "180 Ringing" message to the IP telephone apparatus 102.

In step S506, while the IP telephone apparatus 106 is indicating an incoming call, when the operator lifts the receiver of the IP telephone apparatus 106 (hook-up) and answers the call, the CPU 221 transmits a "200 OK" message as a success response to the SIP server 111.

In step S507, upon reception of the "200 OK" message transmitted in step S506, the CPU of the SIP server 111 transmits a "200 OK" message to the IP telephone apparatus 102.

In step S508, upon reception of the "200 OK" message as a success response from the SIP server 111 via the IP telephone apparatus 102, the CPU 202 transmits an "Ack" message as a response to the SIP server 111.

In step S509, upon reception of the "Ack" message transmitted in step S508, the CPU of the SIP server 111 transmits an "Ack" message to the IP telephone apparatus 106.

Thus, the processing illustrated in FIG. 5 establishes a SIP session between the IP telephone apparatus 102 on the calling side and the IP telephone apparatus 106 on the incoming side, entering a phone call state.

According to the present exemplary embodiment, the CPU 202 transmits the serial number to the operator PC 105 by transmitting an "INVITE" message, in which the serial number is added to the description of the "From" header, via the IP telephone apparatus 102. However, the CPU 202 may transmit the serial number to the operator PC 105 by transmitting an "INVITE" message, in which the description of the serial number is added to Body, via the IP telephone apparatus 102. The CPU 202 may transmit the serial number to the operator PC 105 by transmitting a "NOTIFY" or "MESSAGE" message, other than an "INVITE" message, in which the description of the serial number is added, via the IP telephone apparatus 102. An "INVITE" message, a "NOTIFY" message, and a "MESSAGE" message are examples of control signals related to voice communication performed between the image forming apparatus 101 and the operator PC 105 via the IP telephone apparatuses 102 and 106. Control signals related to voice communication are signals for controlling the start, end, and information transmission in voice communication.

Figure 7:
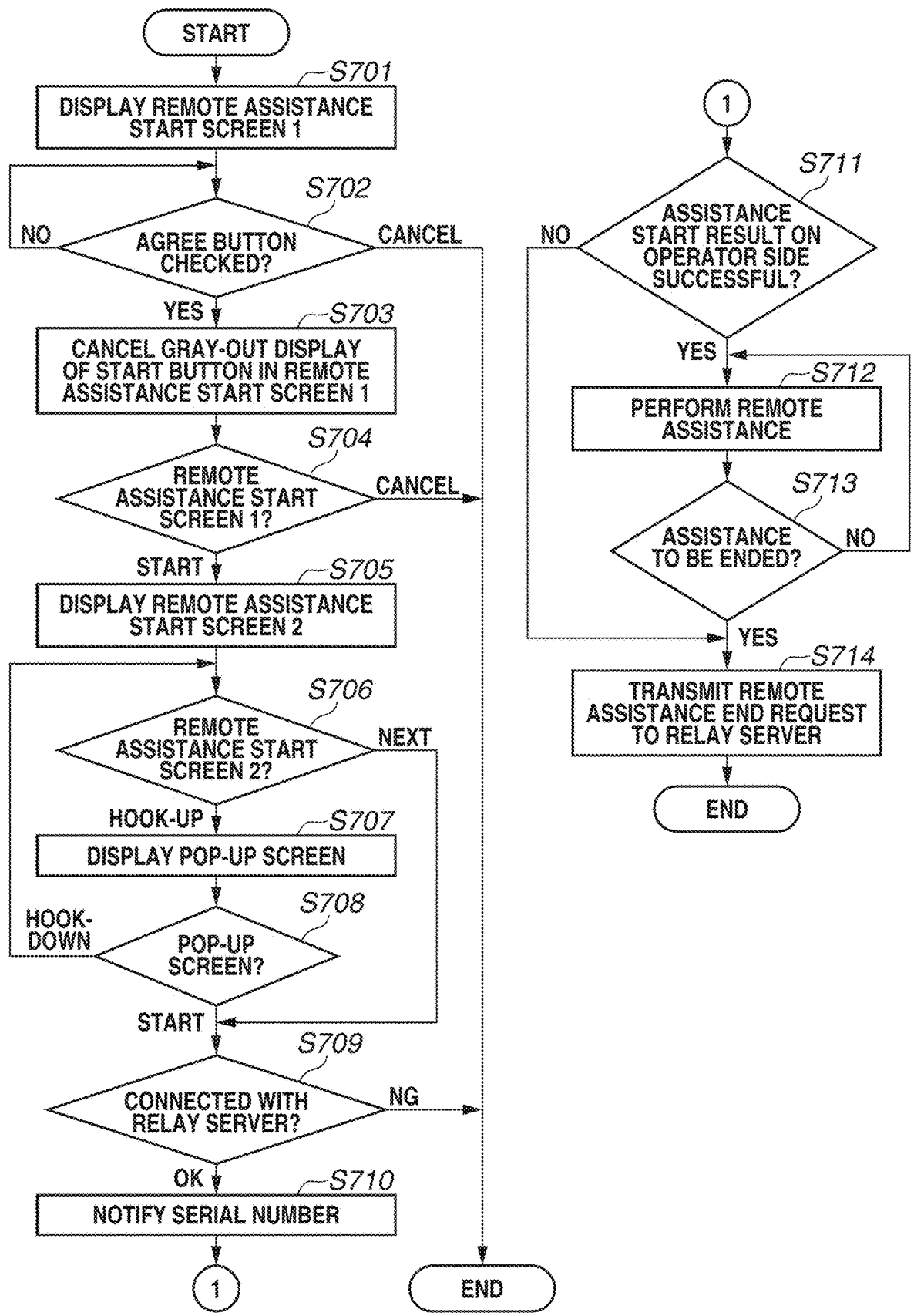
FIG. 7 is a flowchart illustrating an example of processing of an image forming apparatus.

FIG. 7 is a flowchart illustrating an example of processing of the image forming apparatus 101 according to the present exemplary embodiment. Processing performed by the image forming apparatus 101 in remote assistance will be described below with reference to FIG. 7.

In step S701, when the CPU 202 receives a remote assistance start request from the user via the operation panel 215, the CPU 202 displays the screen 301 on the operation panel 215.

In step S702, the CPU 202 determines whether the check box 302 in the screen 301 is checked. When the CPU 202 determines that the check box 302 is checked (YES in step S702), the processing proceeds to step S703. On the other hand, when the CPU 202 determines that the check box 302 is unchecked (NO in step S702), the CPU 202 repeats the processing in step S702. When the CPU 202 detects a selection of the Cancel button 304 (CANCEL in step S702), the processing exits the flowchart illustrated in FIG. 7.

In step S703, the CPU 202 cancels the gray-out display of the Start button 303 to set it in a selectable state. When the Start button 303 is not displayed, the CPU 202 displays the Start button 303 in a selectable state.

In step S704, the CPU 202 determines whether the Start button 303 is selected or whether the Cancel button 304 is selected. When the CPU 202 determines that the Start button 303 is selected (START in step S704), the processing proceeds to step S705. On the other hand, when the CPU 202 determines that the Cancel button 304 is selected (CANCEL in step S704), the processing exits the flowchart illustrated in FIG. 7.

In step S705, the CPU 202 displays the screen 305 including information of the telephone number of the call center on the operation panel 215.

In step S706, the CPU 202 determines whether a hook-up of the IP telephone apparatus 102 is detected or a selection of the Next button 306 is selected. When a hook-up of the IP telephone apparatus 102 is detected (HOOK-UP in step S706), the processing proceeds to step S707. On the other hand, when a selection of the Next button 306 is selected (NEXT in step S706), the processing proceeds to step S709.

If the user desires to make a phone call to the call center by using a telephone other than the IP telephone apparatus 102 (for example, a user's mobile phone), the user selects the Next button 306.

In step S707, the CPU 202 displays the pop-up screen 307 on the screen 305 of the operation panel 215. Since the telephone number of the call center is pre-input in the destination display field 3 of the pop-up screen 307, the user only confirms the telephone number and then selects the Start button 309 without inputting the telephone number. When the CPU 202 detects a selection of the Start button 309, the CPU 202 can make a phone call to the telephone number pre-input in the destination display field 308, via the IP telephone apparatus 102.

In step S708, the CPU 202 determines whether the Start button 309 is selected or the receiver of the IP telephone apparatus 102 is put down (hook-down). When the CPU 202 determines that the Start button 309 is selected (START in step S708), the processing proceeds to step S709. On the other hand, when the CPU 202 determines that the receiver of the IP telephone apparatus 102 is put down (HOOK-DOWN in step S708), the CPU 202 deletes the pop-up screen. Then, the processing returns to step S706.

In step S709, the CPU 202 performs the processing in steps S401 to S411 described above with reference to FIG. 4 to connect with the relay server 109. Then, the CPU 202 determines whether the connection with the relay server 109 is successful. When the CPU 202 determines that the connection with the relay server 109 is successful (OK in step S709), the processing proceeds to step S710. On the other hand, when the CPU 202 determines that the connection with the relay server 109 failed (NG in step S709), the processing exits the flowchart illustrated in FIG. 7.

In step S710, the CPU 202 performs the processing in steps S501 to S509 described above with reference to FIG. 5. According to the present exemplary embodiment, the user makes a phone call to the call center by using the IP telephone apparatus 102. The CPU 202 adds the serial number information in the "INVITE" message to be transmits in step S502 and then transmits the serial number to the IP telephone apparatus 106. This allows the operator to recognize the serial number even if the user does not notify the operator of the serial number during the phone call. On the other hand, if the user makes a phone call to the call center by using a telephone apparatus other than the IP telephone apparatus 102, the user needs to notify the operator of the serial number in the phone call.

In step S711, the CPU 202 receives in step S421 a result of the processing by the operator PC 105 for connecting with the relay server 109 in steps S413 to S420, and determines whether the operator PC 105 is connected with the relay server 109 based on the received result. When the CPU 202 determines that the operator PC 105 has been successfully connected with the relay server 109 (YES in step S711), the processing proceeds to step S712. On the other hand, when the CPU 202 determines that the operator PC 105 has not been connected with the relay server 109 (NO in step S711), the processing proceeds to step S714.

When the CPU 202 determines that the operator PC 105 has been successfully connected with the relay server 109 (YES in step S711), the image forming apparatus 101 becomes ready to receive remote assistance from the operator PC 105 via the relay server 109.

In step S712, the CPU 202 performs POST polling and GET polling for the assistance data together with operator PC 105 (steps S422 and S423), to perform remote assistance.

In step S713, the CPU 202 determines whether to end remote assistance. For example, when the CPU 202 receives a remote assistance end instruction from the user via the operation panel 215, the CPU 202 determines to end remote assistance. On the other hand, for example, when the CPU 202 does not receive a remote assistance end instruction from the user via the operation panel 215, the CPU 202 determines not to end remote assistance. When the CPU 202 determines to end remote assistance (YES in step S713), the processing proceeds to step S714. On the other hand, when the CPU 202 determines not to end remote assistance (NO in step S713), the processing returns to step S712.

In step S714, the CPU 202 transmits a remote assistance end request to the relay server 109 (step S424). Then, the processing exits the flowchart illustrated in FIG. 7.

Through the processing illustrated in FIG. 7, the image forming apparatus 101 can notify the operator of the serial number for connecting with the relay server 109 when starting remote assistance. The image forming apparatus 101 can also make a phone call to the call center without requiring user's operations for inputting the telephone number of the call center.

Figure 8:
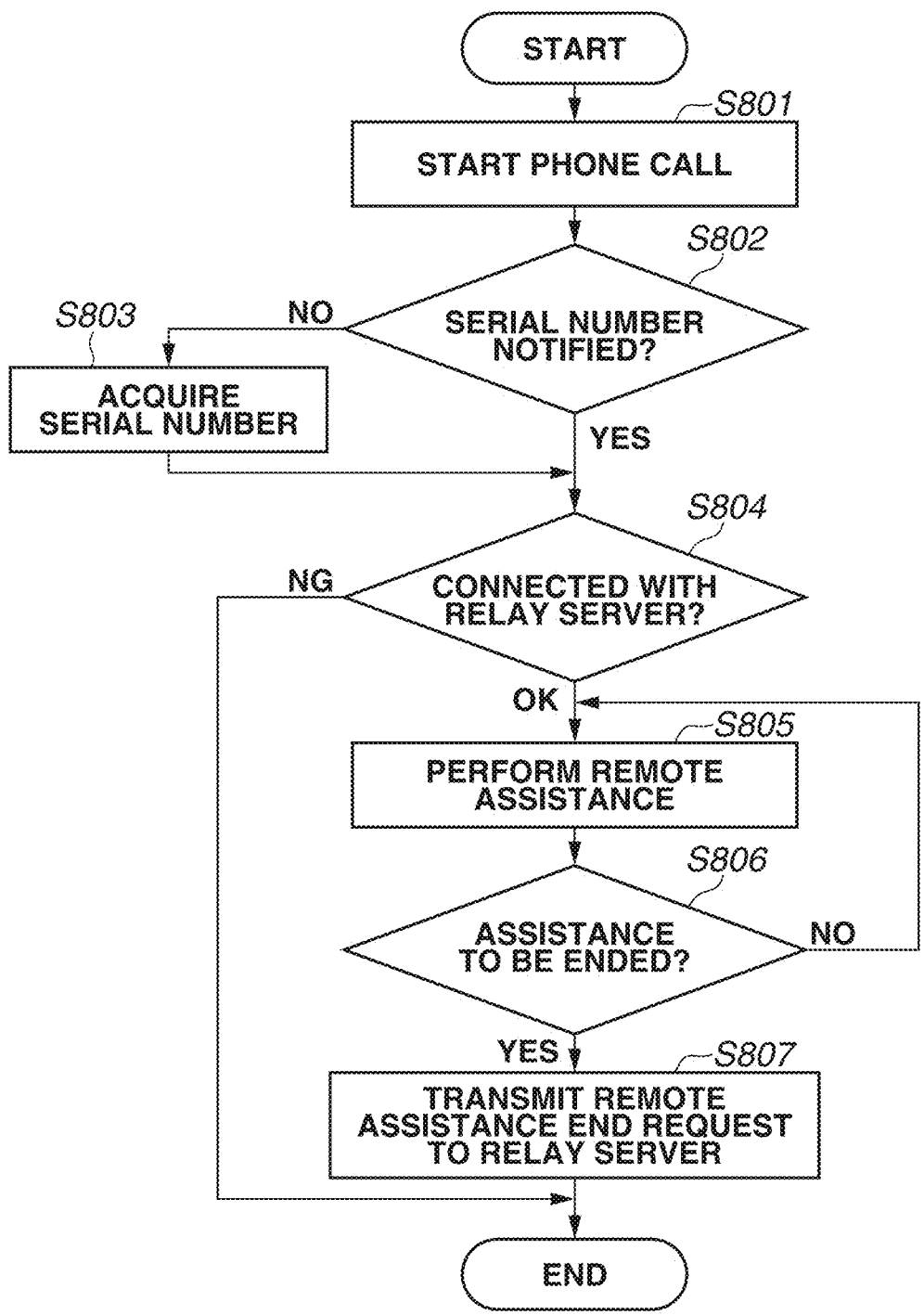
FIG. 8 is a flowchart illustrating an example of processing of an operator personal computer (PC).

FIG. 8 is a flowchart illustrating an example of processing of the operator PC 105 according to the present exemplary embodiment. Processing performed by the operator PC 105 in remote assistance will be described below with reference to FIG. 8. According to the present exemplary embodiment, the operator of the operator PC 105 performs a voice communication with the user by using the IP telephone apparatus 106.

In step S801, when the call center has an incoming call from the IP telephone apparatus 102, the CPU 221 starts a phone call based on an operator's operation via the IP telephone apparatus 106. Through the processing described in FIG. 5, the CPU 221 acquires the serial number information included in the "INVITE" message transmitted from the image forming apparatus 101 and stores the acquired serial number information in the RAM 243.

Therefore, the CPU 221 can acquire the serial number even if the operator is not notified of the serial number from the user and does not perform an operation for inputting the serial number in the operator PC 105 during a phone call.

On the other hand, if the user of the image forming apparatus 101 makes a phone call to the operator by using a telephone apparatus (for example, a user's mobile phone) other than the IP telephone apparatus 102, the operator needs to be notified of the serial number from the user during a phone call.

In step S802, the CPU 221 determines whether the CPU 221 is notified of the serial number from the image forming apparatus 101 via an "INVITE" message. When the CPU 221 determines that the CPU 221 is notified of the serial number from the image forming apparatus 101 (YES in step S802), the processing proceeds to step S804. On the other hand, when the CPU 221 determines that the CPU 221 is not notified of the serial number from the image forming apparatus 101 (NO in step S802), the processing proceeds to step S803.

In step S803, the CPU 221 receives the serial number input by the operator. The operator inputs to the operator PC 105, by using the keyboard 231, the serial number notified of by the user of the image forming apparatus 101 during a phone call. Then, the CPU 221 stores the input serial number information in the RAM 243.

In step S804, the CPU 221 performs the processing in steps S413 to S420 described above with reference to FIG. 4 to connect with the relay server 109. Then, the CPU 221 determines whether the connection with the relay server 109 is successful. When the CPU 221 determines that the connection with the relay server 109 is successful (OK in step S804), the processing proceeds to step S805. On the other hand, when the CPU 221 determines that the connection with the relay server 109 failed (NG in step S804), the processing exits the flowchart illustrated in FIG. 8. When the CPU 221 determines that the connection with the relay server 109 is successful (OK in step S804), the operator PC 105 becomes ready to perform remote assistance for the image forming apparatus 101 via the relay server 109.

In step S805, the CPU 221 performs POST polling and GET polling for the assistance data together with the image forming apparatus 101 (steps S422 and S423), to perform remote assistance.

In step S806, the CPU 221 determines whether to end remote assistance. For example, when the CPU 221 receives a remote assistance end instruction from the image forming apparatus 101, the CPU 221 determines to end remote assistance. On the other hand, for example, when the CPU 221 does not receive a remote assistance end instruction from the image forming apparatus 101, the CPU 221 determines not to end remote assistance. When the CPU 221 determines to end remote assistance (YES in step S806), the processing proceeds to step S807. On the other hand, when the CPU 221 determines not to end remote assistance (NO in step S806), the processing returns to step S805.

In step S807, the CPU 221 transmits a remote assistance end request to the relay server 109 (step S425). Then, the processing exits the flowchart illustrated in FIG. 8.

Through the processing illustrated in FIG. 8, the operator PC 105 can acquire the serial number for connecting with the relay server 109 from the image forming apparatus 101 when starting remote assistance.

According to the present exemplary embodiment, the assistance system implements a voice communication between the user and the operator by using the IP telephone apparatuses 102 and 106 connectable to the IP telephone network 113. However, the assistance system may implement a voice communication between the user and the operator by using a telephone apparatus for achieving a voice communication via a Public Switched Telephone Network (PSTN) line and the Internet instead of using a telephone apparatus for achieving a voice communication via the IP telephone network 113.

According to the present exemplary embodiment, by using the IP telephone apparatus 102, the user of the image forming apparatus 101 makes a phone call to the IP telephone apparatus 106 connected with the operator PC 105. In this case, the CPU 202 may include trouble information indicating trouble such as an error occurred in the image forming apparatus 101 in a control signal related to voice communication, such as an "INVITE" message.

According to the present exemplary embodiment, the image forming apparatus 101 includes the serial number acquired from the relay server 109 in a control signal related to voice communication and transmits the serial number to the operator PC 105. However, in case of a voice communication using a control signal to which information cannot be added, the image forming apparatus 101 cannot add the serial number to the control signal related to voice communication. In this case, the CPU 202 may receive a serial number audio output instruction based on a user's operation via the operation panel 215, and output an audio signal indicating the serial number to the IP telephone apparatus 106. This allows the image forming apparatus 101 to reduce user's time and effort for orally transmitting the serial number.

According to the present exemplary embodiment, the image forming apparatus 101 displays a preset telephone number in the destination display field 308. However, the telephone number of the IP telephone apparatus 106 may change due to a relocation of the call center. If a change in the telephone number of the IP telephone apparatus 106 is planned, the operator PC 105 may transmit the new telephone number information and change timing information to the image forming apparatus 101 in remote assistance for the image forming apparatus 101. Then, at the timing indicated by the change timing information transmitted, the CPU 202 may update the telephone number of the call center to be stored in the HDD 205 to the telephone number indicated by the new telephone number information transmitted, and display the telephone number also in the destination display field 308. Thus, the image forming apparatus 101 can acquire the new telephone number of the remote assistance source.

According to the present exemplary embodiment, as described above, the image forming apparatus 101 detects the start of using the IP telephone apparatus 102 during a period when the screen 301 appears to indicate processing for establishing a connection between the image forming apparatus 101 and the operator PC 105. Then, when the image forming apparatus 101 detects the start of using the IP telephone apparatus 102, the image forming apparatus 101 displays on the operation panel 215 a pop-up screen including the telephone number of the remote assistance source and the Start button 309 for instructing to make a phone call to the telephone number. More specifically, when starting remote assistance, the image forming apparatus 101 can display a screen in which the telephone number of the call center is pre-input. Then, when the image forming apparatus 101 detects a selection of the Start button 309, the image forming apparatus 101 makes a phone call to the telephone number by using the IP telephone apparatus 102. This allows the user to make a phone call to the call center without taking time and effort for finding out and inputting the telephone number of the remote assistance source. The user do not need to perform an operation for inputting the telephone number in this way, reducing user's time and effort for starting remote assistance.

The image forming apparatus 101 transmits the serial number acquired from the relay server 109 to the operator PC 105, by including the serial number in a control signal related to voice communication with the operator PC 105. Thus, the image forming apparatus 101 can notify the operator PC 105 of the serial number without interventions of the user and operator. In this way, the assistance system can reduce user's time and effort for orally notifying the operator of the serial number and reduce operator's time and effort for inputting the notified serial number in the operator PC 105. The assistance system can also prevent trouble due to an incorrect oral transmission of the serial number from the user to the operator.

The first exemplary embodiment has been described centering on processing in which the image forming apparatus 101 acquires the serial number from the relay server 109 and notifies the operator PC 105 of the acquired serial number. A second exemplary embodiment will be described below centering on processing in which the operator PC 105 acquires the serial number from the relay server 109 and notifies the image forming apparatus 101 of the acquired serial number.

When receiving remote assistance, the user of the image forming apparatus 101 makes an inquiry to the call center by telephone. If the call center operator determines that remote maintenance is required based on information acquired from the user, the operator connects the operator PC 105 with the image forming apparatus 101 via the relay server 109 and starts remote assistance. The operator transmits and confirms setting and operation methods as required to proceed with remote assistance while performing a voice communication. As described above, the user who is unfamiliar with remote maintenance uses a voice communication as one of methods for communicating with the operator during remote maintenance. Therefore, it is desirable that the user can speak as required.

However, to start remote maintenance, the user of the image forming apparatus 101 needs to hear the serial number from the call center operator and to perform an operation for inputting the serial number to the operation unit of the operation panel 215 of the image forming apparatus 101. However, there has been a problem that performing an operation while speaking is troublesome and will become a burden on the user. If the user manually inputs a serial number, the user may possibly input an incorrect number and may end up not being able to connect with the operator or being connected with an incorrect operator.

According to the present exemplary embodiment, therefore, while the IP telephone apparatuses 102 and 106 are in a phone call state, the operator PC 105 acquires the serial number from the relay server 109 and notifies the image forming apparatus 101 of the acquired serial number. Then, the image forming apparatus 101 connects with the relay server 109 based on the notified serial number. Accordingly, the assistance system can reduce user's time and effort for acquiring the serial number from the operator and manually inputting the serial number. The system configuration of the assistance system according to the present exemplary embodiment is similar to the system configuration according to the first exemplary embodiment. The hardware configuration of each unit component of the assistance system according to the present exemplary embodiment is similar to the hardware configuration according to the first exemplary embodiment.

FIG. 9 is a sequence diagram illustrating an example of connection processing. Processing of the image forming apparatus 101, the operator PC 105, and the relay server 109 in remote assistance will be described below with reference to FIG. 9. FIG. 9 illustrates processing performed, after the image forming apparatus 101 and the operator PC 105 start a call connection through SIP and enter a phone call state, to establish a connection through a HTTP tunnel via the relay server 109 to change a SIP phone call to a phone call through HTTP media communication.

In step S901, when the user of the image forming apparatus 101 makes a phone call to the call center by using the IP telephone apparatus 102, the CPU 202 transmits an "INVITE" message as a session establishment request to the IP telephone apparatus 106 via the IP telephone apparatus 102.

In step S902, the CPU 221 receives the "INVITE" message transmitted in step S901 via the IP telephone apparatus 106, and changes the IP telephone apparatus 106 to the incoming call state. Then, when the operator lifts the receiver and answers the incoming call by using the IP telephone apparatus 106, the CPU 221 transmits a "200 OK" message to the IP telephone apparatus 102. In step S903, in response to the "200 OK" message transmitted in step S902, the CPU 202 transmits an "ACK" message to the IP telephone apparatus 106.

In step S904, the CPUs 202 and 221 establish a SIP session between the IP telephone apparatuses 102 and 106, entering a phone call state. When the IP telephone apparatuses 102 and 106 are in a phone call state, the CPUs 202 and 221 perform the following processing via the IP telephone apparatuses 102 and 106, respectively. More specifically, the CPUs 202 and 221 perform various types of encoding and compression processing on audio data by using the Voice over Internet Protocol (VoIP) technique to convert the audio data into an IP packet. Then, the CPUs 202 and 221 transmit in real time the generated IP packet based on RTP via the IP telephone network 113 to perform phone call processing.

When the operator determines that remote maintenance is required in a phone call between the user of the image forming apparatus 101 and the call center operator, the operator operates the operator PC 105 to establish a HTTP connection with the relay server 109.

In step S905, the CPU 221 establishes a HTTP connection with the relay server 109 based on an operator's operation via the keyboard 231.

In step S906, the CPU 241 transmits the address of the relay server 109 and the serial number for identifying the present remote assistance to the operator PC 105. The CPU 221 acquires the address of the relay server 109 and the serial number from the relay server 109. The serial number is also information for associating, on the relay server 109, the HTTP connection from the image forming apparatus 101 with the HTTP connection from the operator PC 105 in relation to the present remote assistance.

In step S907, the CPU 221 transmits information about the address of the relay server 109 and the serial number acquired in step S906 to the image forming apparatus 101, by including these pieces of information in a "re-INVITE" message.

In step S908, the CPU 202 acquires the address of the relay server 109 and the serial number from the "re-IN-VITE" message received from the operator PC 105 and transmits a "200 OK" message to the operator PC 105.

In step S909, the CPU 202 establishes a HTTP connection with the relay server 109 specified by the address acquired in step S908 and transmits the serial number acquired in step S908 to the relay server 109.

In step S910, the CPU 241 establishes a session with the operator PC 105 as a communication partner corresponding to the serial number received from the image forming apparatus 101 and transmits a "200 OK" message to the image forming apparatus 101.

In step S911, the CPUs 202 and 221 determine that the path of voice communication with the operator PC 105 is a charging connection, and perform the following processing to make a phone call to the operator PC 105 through HTTP media communication. More specifically, the CPUs 202 and 221 generate a SIP phone call session via the HTTP connections generated in the processing in steps S905 and S906 and the processing in steps S909 and S910.

In step S912, since a HTTP phone call session is established, the CPU 202 transmits a "BYE" message to abandon the session established in step S904 to change subsequent phone calls from a charging connection phone call to a phone call through HTTP media communication.

In step S913, the CPU 221 transmits a "200 OK" message to the image forming apparatus 101 as a response to the "BYE" message transmitted in step S912.

The charging connection line is released in the processing in steps S912 and S913.

Figure 10:
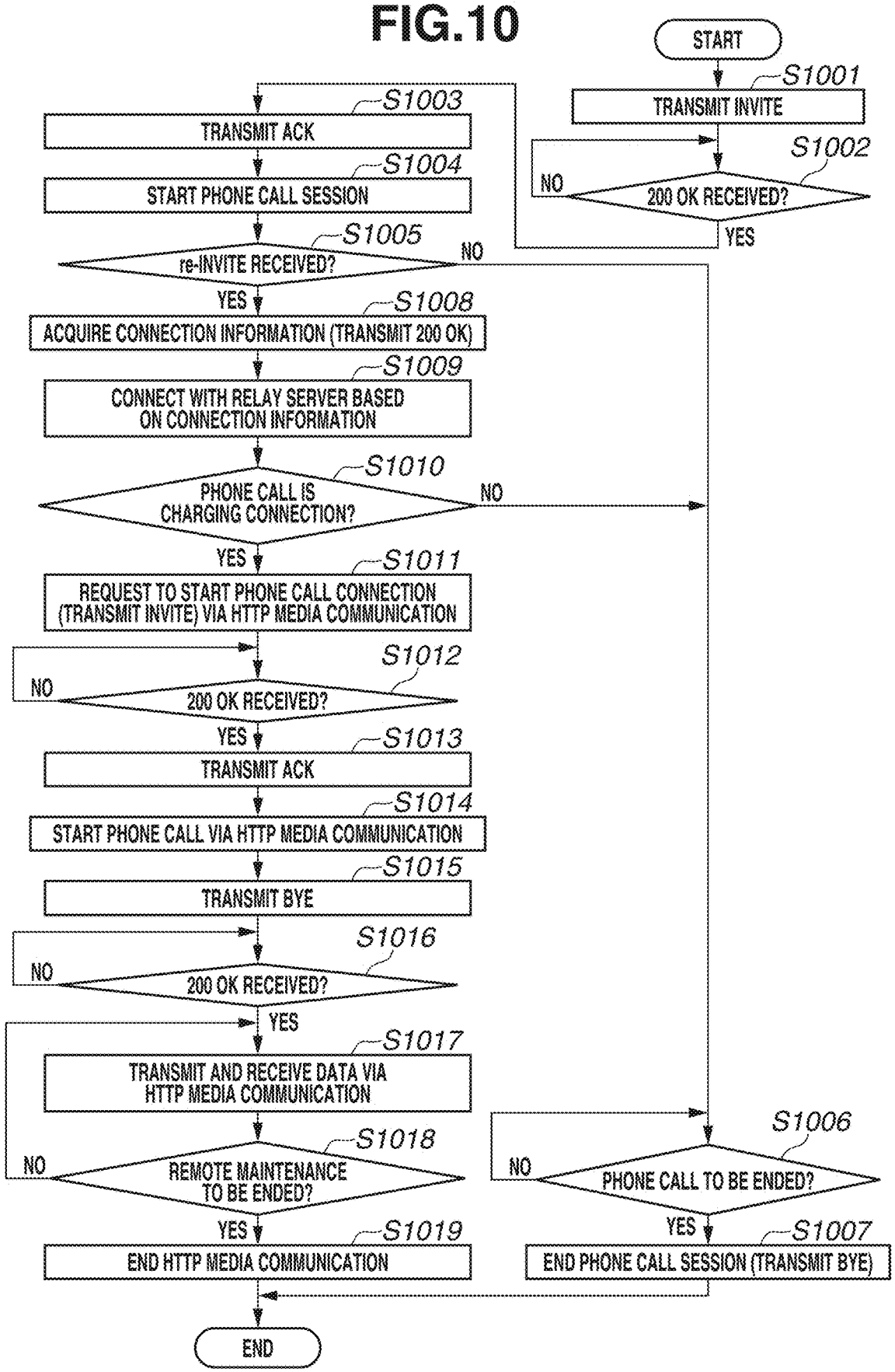
FIG. 10 is a flowchart illustrating an example of processing of the image forming apparatus.

FIG. 10 is a flowchart illustrating an example of processing of the image forming apparatus 101 according to the present exemplary embodiment. Processing performed by the image forming apparatus 101 according to the present exemplary embodiment in remote assistance will be described below with reference to FIG. 10.

In step S1001, when the user of the image forming apparatus 101 performs an operation for making a phone call to the call center by using the IP telephone apparatus 102, the CPU 202 transmits an "INVITE" message to the operator PC 105 via the IP telephone apparatuses 102 and 106.

In step S1002, the CPU 202 determines whether a "200 OK" message as an acknowledgment to the "INVITE" message transmitted in step S1001 is received from the operator PC 105. When the CPU 202 determines that a "200 OK" message is received (YES in step S1002), the processing proceeds to step S1003. On the other hand, when the CPU 202 determines that a "200 OK" message is not received (NO in step S1002), the CPU 202 repeats the processing in step S1002.

In step S1003, the CPU 202 transmits an "ACK" message to the operator PC 105.

In step S1004, the CPU 202 starts a phone call session using the IP telephone apparatuses 102 and 106 together with operator PC 105.

In step S1005, the CPU 202 determines whether a "re-INVITE" message including information about the address of the relay server 109 and the serial number is received from the operator PC 105. When the CPU 202 determines that a "re-INVITE" message is received (YES in step S1005), the processing proceeds to step S1008. On the other hand, when the CPU 202 determines that a "re-INVITE" message is not received (NO in step S1005), the processing proceeds to step S1006.

In step S1006, the CPU 202 determines whether to end the session started in step S1004. For example, when a session end instruction for the session started in step S1004 is received based on an operator's operation via the keyboard 231, the CPU 202 determines to end the session. When the CPU 202 determines to end the session started in step S1004 (YES in step S1006), the processing proceeds to step S1007. On the other hand, when the CPU 202 determines not to end the session started in step S1004 (NO in step S1006), the processing repeats step S1006.

In step S1007, the CPU 202 transmits a "BYE" message to the operator PC 105 and ends the phone call session started in step S1004.

In step S1008, the CPU 202 transmits to the operator PC 105 a "200 OK" message as an acknowledgment to the "re-INVITE" message determined to have been received in step S1005.

In step S1009, the CPU 202 connects with the relay server 109 by transmitting the serial number included in the "re-INVITE" message to the relay server 109 indicated by the address included in the "re-INVITE" message determined to have been received in step S1005. The CPU 202 can connect with the relay server 109 without requiring user's operations. Thus, remote assistance for the image forming apparatus 101 through HTTP communication is started. In step S1010, the CPU 202 determines whether the line connection currently performing a phone call is a charging connection or non-charging connection. For example, if the telephone number originated in step S1001 is an outside line telephone number including a toll number, the CPU 202 determines it to be a charging connection via a public network. On the other hand, if the telephone number originated in step S1001 is a telephone number including an extension number, the CPU 202 determines it to be a non-charging connection not using a public network. When the CPU 202 determines that the line connection currently performing a phone call is a charging connection (YES in step S1010), the processing proceeds to step S1011. On the other hand, when the CPU 202 determines that the line connection currently performing a phone call is a non-charging connection (NO in step S1010), the processing proceeds to step S1006.

In step S1011, to start a HTTP phone call through HTTP media communication, the CPU 202 transmits an "INVITE" message to the operator PC 105 via the relay server 109.

In step S1012, the CPU 202 determines whether a "200 OK" message as a response to the "INVITE" message transmitted in step S1011 is received from the operator PC 105. When the CPU 202 determines that a "200 OK" message as a response is received (YES in step S1012), the processing proceeds to step S1013. On the other hand, when the CPU 202 determines that a "200 OK" message as a response is not received (NO in step S1012), the CPU 202 repeats the processing in step S1012.

In step S1013, the CPU 202 transmits an "ACK" message to the relay server 109.

In step S1014, the CPU 202 starts a phone call session through HTTP communication using the IP telephone apparatuses 102 and 106 together with the operator PC 105. In step S1015, when activating the session started in step S1014, the CPU 202 transmits a "BYE" message to the operator PC 105 to release the line used for the session started in step S1004.

In step S1016, the CPU 202 receives a "200 OK" message as a response to the "BYE" message transmitted in step S1015 to confirm that the phone call line of the charging connection is released.

In step S1017, the CPU 202 makes a phone call through HTTP communication and performs communication of information such as still and moving images for remote assistance.

In step S1018, the CPU 202 determines whether to end remote assistance. For example, when the CPU 202 receives a remote assistance end instruction from the user via the operation panel 215, the CPU 202 determines to end remote assistance. For example, when the CPU 202 does not receive a remote assistance end instruction from the user via the operation panel 215, the CPU 202 determines not to end remote assistance. When the CPU 202 determines to end remote assistance (YES in step S1018), the processing proceeds to step S1019. On the other hand, when the CPU 202 determines not to end remote assistance (NO in step S1018), the processing returns to step S1017.

In step S1019, the CPU 202 ends the session started in step S1014.

Figure 11:
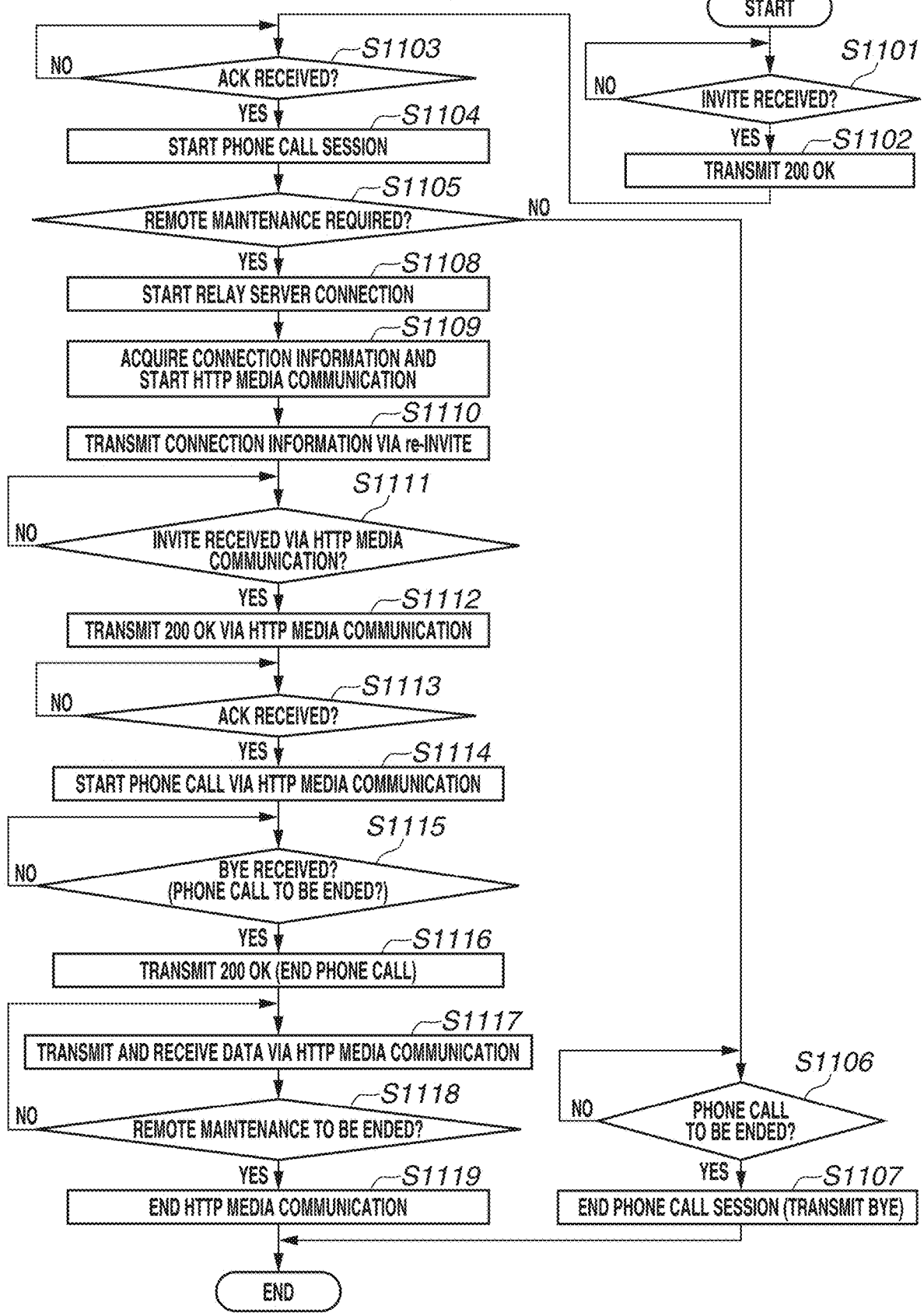
FIG. 11 is a flowchart illustrating an example of processing of the operator PC.

FIG. 11 is a flowchart illustrating an example of processing of the operator PC 105 according to the present exemplary embodiment. Processing performed by the operator PC 105 according to the present exemplary embodiment in remote assistance will be described below with reference to FIG. 11.

In step S1101, the CPU 221 waits for an incoming call using the IP telephone apparatus 102 from the user of the image forming apparatus 101 via the IP telephone apparatus 106 and determines whether an "INVITE" message is received from the image forming apparatus 101. When the CPU 221 determines that an "INVITE" message is received from the image forming apparatus 101 (YES in step S1101), the processing proceeds to step S1102. On the other hand, when the CPU 221 determines that an "INVITE" message is not received from the image forming apparatus 101 (NO in step S1101), the CPU 221 repeats the processing in step S1101.

In step S1102, when the IP telephone apparatus 106 can make a phone call, the CPU 221 transmits to the image forming apparatus 101 a "200 OK" message as an acknowledgment to the "INVITE" message determined to have been received in step S1101.

In step S1103, the CPU 221 determines whether an "ACK" message as a response to the "200 OK" message transmitted in step S1102 is received from the image forming apparatus 101. When the CPU 221 determines that an "ACK" message is received (YES in step S1103), the processing proceeds to step S1104. On the other hand, when the CPU 221 determines that an "ACK" message is not received (NO in step S1103), the CPU 221 repeats the processing in step S1103.

In step S1104, the CPU 221 generates a phone call session using the IP telephone apparatuses 102 and 106 together with the image forming apparatus 101, entering a phone call state.

In step S1105, the CPU 221 determines whether an instruction for starting remote assistance for the image forming apparatus 101 is received based on an operation by the operator of the call center via the keyboard 231. When the CPU 202 determines that an instruction for starting remote assistance for the image forming apparatus 101 is received (YES in step S1105), the processing proceeds to step S1108. On the other hand, when the CPU 202 determines that an instruction for starting remote assistance for the image forming apparatus 101 is not received (NO in step S1105), the processing proceeds to step S1106. In step S1106, the CPU 221 determines whether a correspondence by phone call is completed. For example, when the end of a correspondence by phone call is notified based on an operator's operation via the keyboard 231, the CPU 221 determines that the correspondence by phone call is completed. When the CPU 221 determines that a correspondence by phone call is completed (YES in step S1106), the processing proceeds to step S1107. On the other hand, when the CPU 221 determines that a correspondence by phone call is not completed (NO in step S1106), the CPU 221 repeats the processing in step S1106.

In step S1107, the CPU 221 transmits a "BYE" message to the image forming apparatus 101 and ends the phone call session started in step S1104.

In step S1108, the CPU 221 connects with the relay server 109.

In step S1109, the CPU 221 acquires the serial number for identifying the present remote assistance and the address of the relay server 109 and starts HTTP communication between the operator PC 105 and the relay server 109.

In step S1110, the CPU 221 transmits a "re-INVITE" message including the address of the relay server 109 and the serial number acquired in step S1109 to the image forming apparatus 101. Thus, in a procedure for handling a voice communication with the image forming apparatus 101 via the IP telephone apparatuses 102 and 106, the CPU 221 transmits a "re-INVITE" message including the address of the relay server 109 and the serial number to the image forming apparatus 101.

In step S1111, the CPU 221 determines whether an "INVITE" message as a request for phone call session connection through HTTP communication is received from the image forming apparatus 101 via the relay server 109. When the CPU 221 determines that an "INVITE" message is received (YES in step S1111), the processing proceeds to step S1112. On the other hand, when the CPU 221 determines that an "INVITE" message is not received (NO in step S1111), the CPU 221 repeats the processing in step S1111.

In step S1112, the CPU 221 transmits to the image forming apparatus 101 via the relay server 109 a "200 OK" message as an acknowledgment to the "INVITE" message determined to have been received in step S1111.

In step S1113, the CPU 221 determines whether an "ACK" message as a response to the "200 OK" message transmitted in step S1112 is received from the image forming apparatus 101 via the relay server 109. When the CPU 221 determines that an "ACK" message is received (YES in step S1113), the processing proceeds to step S1114. On the other hand, when the CPU 221 determines that an "ACK" message is not received (NO in step S1113), the CPU 221 repeats the processing in step S1113.

In step S1114, the CPU 221 starts a phone call session with the image forming apparatus 101 through HTTP communication via the relay server 109.

In step S1115, the CPU 221 determines whether a "BYE" message as a session end instruction for the session started in step S1104 is received from the image forming apparatus 101. When the CPU 221 determines that a "BYE" message is received (YES in step S1115), the processing proceeds to step S1116. On the other hand, when the CPU 221 determines that a "BYE" message is not received (NO in step S1115), the CPU 221 repeats the processing in step S1115.

In step S1116, the CPU 221 transmits to the image forming apparatus 101 a "200 OK" message as a response to the "BYE" message received in step S1115, and ends the session started in step S1104.

In step S1117, the CPU 221 performs processing for making a phone call through HTTP communication and performs processing for communication of information such as still and moving images for remote maintenance.

In step S1118, the CPU 221 determines whether to end remote assistance. For example, when a remote assistance end instruction is received from the image forming apparatus 101, the CPU 221 determines to end remote assistance. When the CPU 221 determines to end remote assistance (YES in step S1118), the processing proceeds to step S1119. On the other hand, when the CPU 221 determines not to end remote assistance (NO in step S1118), the processing returns to step S1117.

In step S1119, the CPU 221 ends the session started in step S1114.

Through the above-described processing according to the present exemplary embodiment, the operator PC 105 acquires the serial number required for a connection for remote assistance from the relay server 109, and notifies the image forming apparatus 101 of the acquired serial number by including the serial number in a request defined in SIP. Thus, when the operator PC 105 acquires the serial number from the relay server 109, the image forming apparatus 101 can acquire the serial number from the operator PC 105. In this case, the user does not need to hear the serial number from the operator by phone call and manually input the serial number. Accordingly, the assistance system can reduce time and effort for starting remote assistance even when the operator PC 105 acquires the serial number from the relay server 109. The assistance system can also reduce the possibility that an incorrect oral transmission is performed between the operator and the user and accordingly the image forming apparatus 101 mis-connects with an incorrect operator PC.

When the image forming apparatus 101 includes trouble information indicating trouble such as an error occurred in the image forming apparatus 101 in a control signal related to voice communication, such as an "INVITE" message, the CPU 221 may perform the following processing. More specifically, the CPU 221 displays on the display 232 the trouble information transmitted from the image forming apparatus 101. Then, if the trouble indicated by the trouble information is set as trouble requiring remote assistance, the CPU 221 may output a message or other information prompting remote assistance by displaying the information on the display 232. The CPU 221 may also output a message or other information prompting remote assistance as audio information to the audio input/output apparatus 234.

At least one of the functions according to the above-described exemplary embodiments can also be achieved when a program is supplied to a system or apparatus via a network or storage medium, and at least one processor in a computer of the system or apparatus reads and executes the program. The at least one function can also be achieved by a circuit (for example, an application specific integrated circuit (ASIC)).

While the present disclosure has specifically been described in detail based on the above-described exemplary embodiments, these embodiments are not seen to be limiting. For example, a part or all of the above-described functional configuration of the assistance system can be implemented as hardware in the image forming apparatus 101 or the operator PC 105.

The above-described exemplary embodiments can be arbitrarily combined.

The above-described configurations and processing of the exemplary embodiments can be applied to a PC, computer, service apparatus, etc. other than an image forming apparatus.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-016794, filed Feb. 1, 2017, which is hereby incorporated by reference herein in its entirety.

What is claimed is:

1. A communication system comprising:
   a first information processing apparatus;
   a second information processing apparatus; and
   a relay server configured to relay remote access communication between the first information processing apparatus and the second information processing apparatus,
   the first information processing apparatus comprising at least one controller configured to function as:
      a unit configured to access the relay server via HTTP communication and obtain first identification information; and
      a unit configured to output information based on the obtained first identification information to a destination indicated by a telephone number via a communication path used for voice communication, the information being included in a control signal of the voice communication,
   the second information processing apparatus comprising at least one controller configured to function as:
      a unit configured to obtain second identification information; and a unit configured to notify the second identification information to the relay server via HTTP communication, the relay server comprising at least one controller configured to function as:

a unit configured to relay the communication between the first information processing apparatus and the second information processing apparatus based at least on notification of the second identification information matching the first identification information from the second information processing apparatus.

2. The communication system according to claim 1, wherein the control signal further includes trouble information indicating a trouble having occurred in the first information processing apparatus.

3. The communication system according to claim 1, wherein the communication path used for the voice communication is a communication path of a Voice over Internet Protocol (VoIP) telephone.

4. The communication system according to claim 1, wherein the control signal is one of an INVITE signal, a NOTIFY signal, and a MESSAGE signal.

5. The communication system according to claim 1, wherein the control signal further includes information for obtaining an address of the relay server.

6. The communication system according to claim 1, wherein the telephone number is a registered telephone number that is registered in the first information processing apparatus in advance.

7. The communication system according to claim 6, wherein the first information processing apparatus is capable of receiving an instruction to change the registered telephone number from the second information processing apparatus via the remote access communication.

8. The communication system according to claim 6,
wherein the first information processing apparatus includes a voice communication device, and
wherein the registered telephone number is displayed on a display unit of the first information processing apparatus in accordance with a hook-up of the voice communication device.

9. The communication system according to claim 1, wherein the first information processing apparatus is connected to a voice communication device.

10. The communication system according to claim 1, wherein the second information processing apparatus is connected to a voice communication device.

11. The communication system according to claim 1,
wherein the second information processing apparatus includes a voice communication device, and
wherein a phone call to the telephone number is received by the voice communication device.

12. The communication system according to claim 1, wherein a display unit of a voice communication device that operates the second information processing apparatus displays the information output to the destination indicated by the telephone number.

13. An information processing apparatus capable of remote access communication with an external apparatus via a relay server, the information processing apparatus comprising at least one controller configured to function as:

a unit configured to access the relay server via HTTP communication and obtain identification information for an external apparatus to communicate with the information processing apparatus via the relay server;

a unit configured to output information based on the obtained identification information to a destination indicated by a telephone number via a communication path used for voice communication, the information being included in a control signal of the voice communication; and a unit configured to communicate, via the relay server, with an external apparatus having notified identification information matching the obtained identification information to the relay server.

14. A method of controlling an information processing apparatus capable of remote access communication with an external apparatus via a relay server, the method comprising:

accessing the relay server via HTTP communication and obtaining identification information for an external apparatus to communicate with the information processing apparatus via the relay server;

outputting information based on the obtained identification information to a destination indicated by a telephone number via a communication path used for voice communication, the information being included in a control signal of the voice communication; and communicating, via the relay server, with an external apparatus having notified identification information matching the obtained identification information to the relay server.

* * * * *